United States Patent
Jeon et al.

(10) Patent No.: US 9,083,974 B2
(45) Date of Patent: Jul. 14, 2015

(54) INTRA PREDICTION MODES

(75) Inventors: Yongjoon Jeon, Seoul (KR); Jaewon Sung, Seoul (KR); Seungwook Park, Seoul (KR); Joonyoung Park, Seoul (KR); Byeongmoon Jeon, Seoul (KR); Jaehyun Lim, Seoul (KR); Jungsun Kim, Seoul (KR); Younghee Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 13/109,129

(22) Filed: May 17, 2011

(65) Prior Publication Data

US 2011/0280304 A1 Nov. 17, 2011

Related U.S. Application Data

(60) Provisional application No. 61/345,583, filed on May 17, 2010, provisional application No. 61/348,232, filed on May 25, 2010, provisional application No. 61/348,243, filed on May 26, 2010, provisional application No. 61/349,197, filed on May 27, 2010.

(51) Int. Cl.
*H04B 1/66* (2006.01)
*H04N 19/182* (2014.01)
(Continued)

(52) U.S. Cl.
CPC ........... *H04N 19/182* (2014.01); *H04N 19/103* (2014.01); *H04N 19/105* (2014.01); *H04N 19/11* (2014.01); *H04N 19/176* (2014.01); *H04N 19/593* (2014.01)

(58) Field of Classification Search
CPC .................. H04N 19/00018; H04N 19/00024; H04N 19/00042; H04N 19/00278; H04N 19/00303; H04N 19/00763
USPC ............................................ 375/240.12, 240
See application file for complete search history.

(56) References Cited

U.S. PATENT DOCUMENTS

2005/0105621 A1    5/2005  Ju
2006/0008006 A1*  1/2006  Cha et al. ................. 375/240.16
(Continued)

FOREIGN PATENT DOCUMENTS

CN          1615025 A    5/2005
CN     101019437 A    8/2007
(Continued)

OTHER PUBLICATIONS

Richardson, H.264 and MPEG-4 Video Compression: Video Coding for Next-generation Multimedia, 2003, John Wiley & Son, Chapter 6.*
Wriggers, Interpolation and Morphing, 2003, The University of Texas, pp. 1-123.*
(Continued)

*Primary Examiner* — Sath V Perungavoor
*Assistant Examiner* — Peter D Le
(74) *Attorney, Agent, or Firm* — Fish & Richardson P.C.

(57) ABSTRACT

New intra angular prediction modes and methods for decoding are offered for providing greater accuracy when processing predictions of digital video data blocks. One new method considers predicting a current prediction sample by taking the linear interpolation of two previously reconstructed reference samples that lay along a common angular line. Another new method offers a method for making previously unavailable samples from a neighboring block available as reference samples when predicting a current prediction sample. Another new method considers a new combined intra prediction mode that utilizes a local mean to predict a current prediction sample. And a new decoding method offers to rearrange the order in which video data blocks are predicted based on the intra prediction mode used for predicting the video data blocks.

5 Claims, 22 Drawing Sheets

(51) Int. Cl.
*H04N 19/105* (2014.01)
*H04N 19/176* (2014.01)
*H04N 19/593* (2014.01)
*H04N 19/11* (2014.01)
*H04N 19/103* (2014.01)

(56) References Cited

U.S. PATENT DOCUMENTS

| | | |
|---|---|---|
| 2006/0013320 A1 | 1/2006 | Oguz |
| 2006/0188165 A1 | 8/2006 | Karczewicz |
| 2006/0227863 A1 | 10/2006 | Adams |
| 2007/0002948 A1 | 1/2007 | Shibahara et al. |
| 2007/0053443 A1* | 3/2007 | Song ................ 375/240.24 |
| 2007/0065027 A1* | 3/2007 | Boon et al. ............ 382/238 |
| 2007/0098070 A1* | 5/2007 | Saigo et al. ......... 375/240.12 |
| 2007/0154087 A1 | 7/2007 | Cho et al. |
| 2009/0003716 A1* | 1/2009 | Sekiguchi et al. ....... 382/238 |
| 2009/0225834 A1 | 9/2009 | Song et al. |
| 2009/0232207 A1 | 9/2009 | Chen |
| 2010/0104020 A1 | 4/2010 | Ju |
| 2011/0249733 A1* | 10/2011 | Zhao et al. ......... 375/240.12 |
| 2011/0249741 A1* | 10/2011 | Zhao et al. ......... 375/240.15 |

FOREIGN PATENT DOCUMENTS

| | | |
|---|---|---|
| WO | WO 2004/064406 A1 | 7/2004 |
| WO | WO 2009/051419 A2 | 4/2009 |
| WO | WO 2009/110753 A2 | 9/2009 |

OTHER PUBLICATIONS

Richardson, H.264 and MPEG-4 Video Compression: Chapter 5-6; 2003, Wiley, pp. 306.*
European Search Report dated Dec. 20, 2012 for Application No. 11004080, 15 pages.
Yan Ye, et al:"Improved h.264 intra coding based on bi-directional intra prediction, directional transform, and adaptive coefficient scanning", Image Processing, 2008. ICIP 2008. 15th IEEE International Conference, IEEE, Piscataway, NJ, USA, Oct. 12, 2008, pp. 2116-2119, XP031374452, ISBN:978-1-4244-1765-0.
Zhang Nan, et al:"Spatial prediction based on intra-coding", 2004 IEEE International Conference on Multimedia and Expo:Jun. 27-30, 2004, Taipei, Taiwan, IEEE Operations Center, Piscataway, NJ, vol. 1, Jun. 27, 2004, pp. 97-100, XP010770753, DOI: 10.1109/ICME.2004.1394134 ISBN: 978-0-7803-8603-7.
International Search Report ated Jan. 16, 2012 for Application No. PCT/KR2011/003622, in English, 3 pages.
European Search Report dated Aug. 10, 2012 for Application No. 11004080, 7 pages.
Joint Video Team (JVT) of ISO/IEC MPEG and ITU-T VCEG; "Working Draft No. 2, Revision O(WD-2)", Document JVT-B118, XX, XX, Dec. 3-7, 2001, pp. 1-100, XP-001086632.
Thomas Davies (BBC) et al. "Suggestion for a Test Model", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); URL: http://wft3.itu.int/av-arch/jctvc-site/, May 7, 2010, pp. 1-30, XP-030007526, ISSN:0000-0049.
Bjontegaard G. (Editor): "H.26L Test Model Long Term No. 8 (TML-8) Drato", ITU Study Group 16—Video Coding Experts Group, XX, XX, vol. VECG-M81, Apr. 2, 2001, 6 pages, XP-002250455.

* cited by examiner vertical prediction mode horizontal prediction mode angular down-left prediction mode angular down-right prediction mode vertical-right prediction mode horizontal-down prediction mode vertical-left prediction mode horizontal-up prediction mode step 0 step 1 step 2 step 3

PU size = 2TUx2TU size    PU size = 4TUx4TU size

2201    Intra Angular    2202
        (bottom right)
        prediction mode

Intra Vertical
prediction mode

Intra Horizontal
prediction mode

2701  Intra DC prediction mode  2702

INTRA PREDICTION MODES

This application claims the benefit of U.S. Provisional Patent Application No. 61/345,583 filed on May 17, 2010; U.S. Provisional Patent Application No. 61/348,232 filed on May 25, 2010; U.S. Provisional Patent Application No. 61/348,243 filed on May 26, 2010; and U.S. Provisional Patent Application No. 61/349,197 filed on May 27, 2010, which are hereby incorporated by reference as if fully set forth herein.

BACKGROUND

1. Field of the Invention

The present invention relates to a method and apparatus for performing intra prediction type decoding on digital video data that has been encoded using an intra prediction type prediction mode. The present invention also relates to a method and apparatus for providing the proper signaling to a decoding unit for informing the decoding unit as to the proper intra prediction mode to apply.

2. Discussion of the Related Art

Generally there are two methods for accomplishing video data compression in order to eliminate temporal and spatial redundancy found amongst video data. Eliminating temporal and spatial redundancy is an important requirement to increase a compression ratio for the video data, which in turn will decrease an overall video data size for later storage or transmission.

An inter prediction encoding method is able to predict a current video data block based on similar regions found on a previously encoded picture of video data that precedes a current picture that includes the current video data block. And an intra prediction encoding method is able to predict a current video data block based on previously encoded blocks that are adjacent to the current video data block and within a same picture. The inter prediction method is referred to as a temporal prediction method, and the intra prediction method is referred to as a spatial prediction method.

An encoding unit is able to take an original RGB video signal and encode it into digital video data that serves as a digital representation of the original RGB video signal. By processing both the inter and intra predictions on the original RGB video signal, the encoding unit is able to create an accurate digital video representation of the original RGB video signal. Each block of digital video data that is prediction processed is referred to as a prediction unit. Depending on whether a prediction unit was processed according to an intra prediction mode or inter prediction mode, the prediction unit may come in a variety of available block sizes. Once the encoding unit has encoded all of the original RGB video signal into corresponding prediction units of digital video data, the resulting digital video data may be transmitted to a decoding unit for decoding and reproduction of the original RGB video signal. In order for the receiving decoding unit to reproduce an accurate reproduction of the original RGB video signal, the decoding unit must perform the same prediction mode processing on a prediction unit as was used at the encoding unit.

Pertaining specifically to the intra prediction method for prediction processing a prediction unit of digital video data, there exists various intra prediction modes known today for accomplishing the spatial prediction that defines the intra prediction method. Yet even with the various intra prediction modes currently available, there is always the need to update existing intra prediction modes and to offer new intra prediction modes in order to accomplish more accurate predictions.

When increasing the total number of intra prediction modes available for intra predicting a prediction unit, there is the often-times overlooked consequence of increasing a maximum binary codeword length that is needed to identify each of the available intra prediction modes. As noted above, when the encoding unit performs prediction processing on a prediction unit according to a specific intra prediction mode, the decoding unit must then perform prediction processing on the prediction unit according to the same specific intra prediction mode to ensure accurate reproduction of the original RGB video signal. The only way to notify a decoding unit as to which specific intra prediction mode was used to predict the particular prediction unit at the encoding unit is to attach intra prediction mode identifying information to each prediction unit. This is an undesirable consequence of offering new intra prediction modes. This way, the decoding unit can parse the intra prediction mode identifying information and determine the proper intra prediction mode to process on a particular prediction unit.

This being said, each intra prediction mode identifying information will be a binary codeword comprised of '0's and '1' in terms of digital data. And as the number of new intra prediction modes that need to be uniquely identified increases, so too will the maximum length of the binary codeword that corresponds to the intra prediction mode identifying information. As a simple example, it may only require a maximum 3 bit long codeword to uniquely identify four unique intra prediction modes. '01' can identify the first intra prediction mode, '10' can identify the second intra prediction mode and '100' can identify the third intra prediction mode. However by adding just two new intra prediction modes, the maximum bit length for the codewords identifying each of the intra prediction modes may grow to a maximum 4 bit long codeword. To identify the new fifth intra prediction mode the codeword '1001' may be assigned, and to identify the sixth new intra prediction mode the codeword '1101' may be assigned. Therefore the real cost of increasing the number of total intra prediction modes available is in the number of total digital information that must be transmitted to identify all of the new intra prediction modes. This in turn results in more and more information bits needing to be transmitted along with the actual video data bits, which obviously decreases the efficiency of the overall video signal compression.

Therefore there also exists a need to conserve a total number of informational bits transmitted with the video data by reducing the maximum bit length of the codewords assigned to identify each new intra prediction mode.

SUMMARY OF THE INVENTION

Accordingly, it is an object of the present invention to offer new intra prediction modes that provide more accurate predictions, when compared to previous intra prediction modes, of prediction units that are processed by a decoding unit.

Another object of the present invention is to provide a method for signaling the new intra prediction modes so that the decoding unit may properly identify the new intra prediction modes when predicting a current prediction unit.

Another object of the present invention is to minimize the maximum binary codeword length that is required to be transmitted along with digital video data for signaling each of the available intra prediction modes.

Additional advantages, objects and features of the invention will be set forth in part in the description and figures which follows, and in part will become apparent to those having ordinary skill in the art upon examination of the following or may be learned from practice of the invention.

To achieve these objects and other advantages according to the present invention, as embodied and broadly described herein, a number of new angular prediction modes are offered. One of the new angular prediction modes according to the present invention is able to reference two reconstructed samples from neighboring blocks. The two reference samples that are referenced from the neighboring blocks are obtained along one of a plurality of available predetermined angles that pass through the current prediction unit and the two reference samples. Each of the two reference samples used to predict a current prediction sample are weighted according to a proximity to the current prediction sample. This is an improvement over the previous angular prediction modes that referenced only a single reconstructed sample from a neighboring block.

According to another aspect of the present invention, a new enhanced angular intra prediction mode is offered that allows referencing previously unavailable reference samples. Previously, reference samples were made to be unavailable for a variety of reasons, such as for belonging to a separate slice from a current prediction unit or for not being previously reconstructed. However, regardless of the reason such samples could not previously be referenced, the new enhanced angular intra prediction mode of the present invention aims to offer methods for allowing such previously unavailable samples to be referenced as reference samples when predicting samples of a current prediction unit. This is a more flexible and accurate approach over the previous angular intra prediction modes.

According to another aspect of the present invention, a new combined intra prediction mode is offered that combines a weighted local mean of three neighboring reference samples with a weighted angular prediction to process a prediction of a current prediction sample. The new combined intra prediction mode according to the present invention will first obtain a local mean from three reference samples that neighbor a current prediction sample and then obtain an angular prediction for the current prediction sample. The new combined intra prediction mode then processes a prediction of the current prediction sample by combining a weighted value for both of these values. This provides a more accurate prediction of the current sample than seen in the prior art.

According to another aspect of the present invention, a new method for ordering the sequence in which samples within a current prediction unit will be prediction processed is offered. According to this new method, the ordering of current prediction samples that will be predicted will depend on the specific direction of a current intra prediction mode identified for predicting the current prediction unit. This new method provides a more efficient method for performing the prediction processing on the current prediction unit over the generalized raster scanning prediction sequence known in the prior art.

According to another aspect of the present invention, a reduction in overall codeword bits that need to be transmitted is accomplished. The present invention is able to accomplish this reduction by reducing the number of overall informational bits that need to be transmitted from an encoding unit to a decoding unit. This is generally accomplished by making information transmitted later in time dependent on information transmitted prior in time when possible. A more detailed explanation is provided in the details and figures described within this disclosure.

It is to be understood that both the foregoing general description and the following detailed description of the present invention are exemplary and explanatory and are intended to provide further explanation of the present invention as claimed.

DETAILED DESCRIPTION

Reference will now be made in detail to the preferred embodiments of the present invention, examples of which are illustrated in the accompanying drawings. Terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in an intended way. The embodiments disclosed in this disclosure and configurations shown in the accompanying drawings are exemplary in nature and are not intended to be inclusive in nature. The preferred embodiments do not represent all possible technical variations of the present invention. Therefore, it is understood that the present invention covers the modifications and variations of this invention provided they come within the scope of the appended claims and their equivalents at the timing point of filing this application.

It is noted that for the purposes of the detailed explanation that follows, all mention of a neighboring block is understood to be in reference to a block that neighbors a current prediction unit. A current prediction unit is understood to include the current prediction samples that are being prediction processed according to the new intra prediction modes of the present invention. Also all mention of intra angular and intra directional prediction modes are considered to be one and the same. The intra angular and intra directional prediction modes are to include horizontal and vertical prediction modes.

Figure 1:
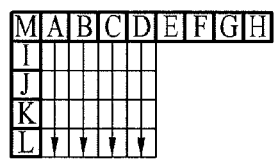
FIG. 1 illustrates examples of intra directional mode predictions according to the present invention.
Figure 1:
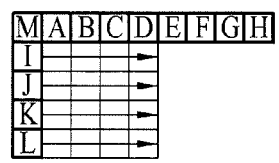
Figure 1:
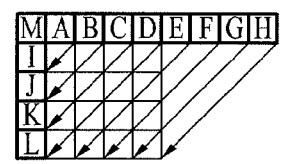
Figure 1:
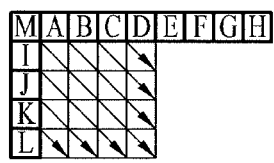
Figure 1:
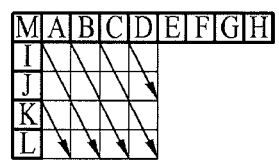
Figure 1:
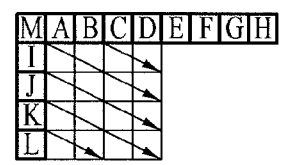
Figure 1:
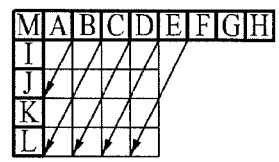
Figure 1:
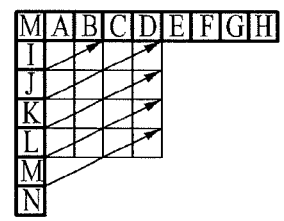
Figure 2:
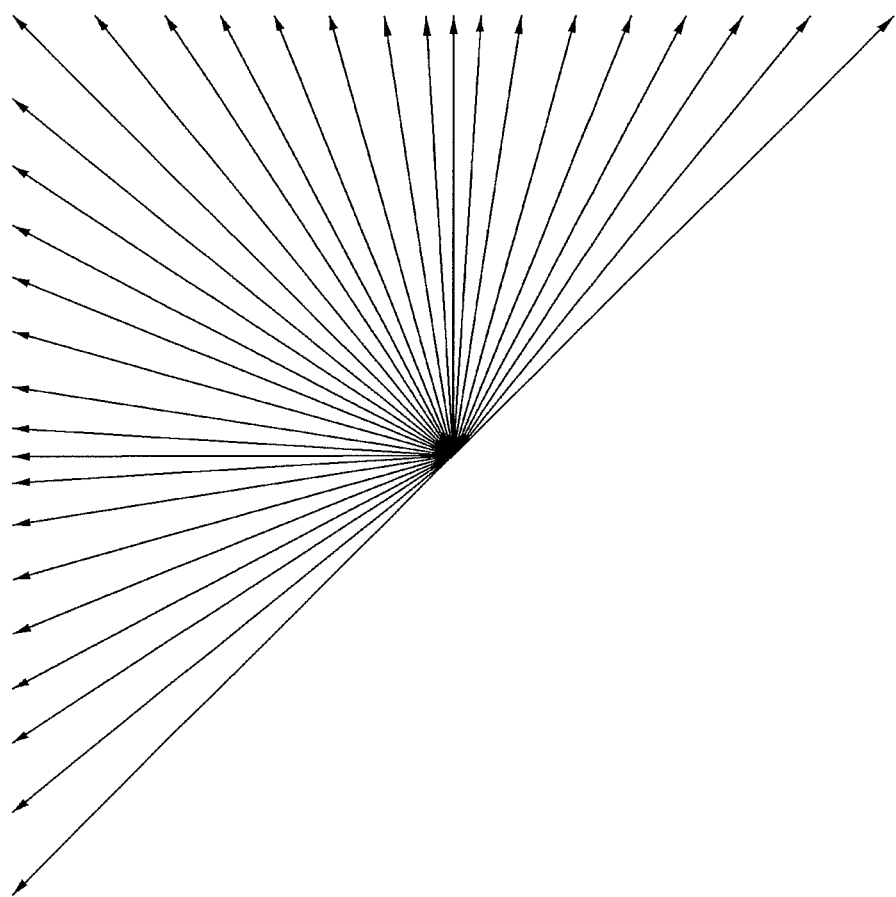
FIG. 2 illustrates a range of angles along which the new intra angular mode predictions may be taken according to the present invention.

FIG. 1 exemplifies a variety of intra prediction modes that may be utilized according to aspects of the current invention. These intra prediction modes correspond to a vertical prediction mode, horizontal prediction mode, angular down-left prediction mode, angular down-right prediction mode, vertical-right prediction mode, horizontal-down prediction mode, vertical-left prediction mode and horizontal-up prediction mode. The surrounding bold boxes A-M represent reconstructed video data samples that are available as a reference sample when predicting each of the samples existing in a current prediction unit. In the examples illustrated by FIG. 1, the current prediction unit is the 4×4 size block having the directional arrows going through it. FIG. 2 is then a visual representation encompassing additional intra prediction angles that may be utilized according to aspects of the present invention.

Figure 3:
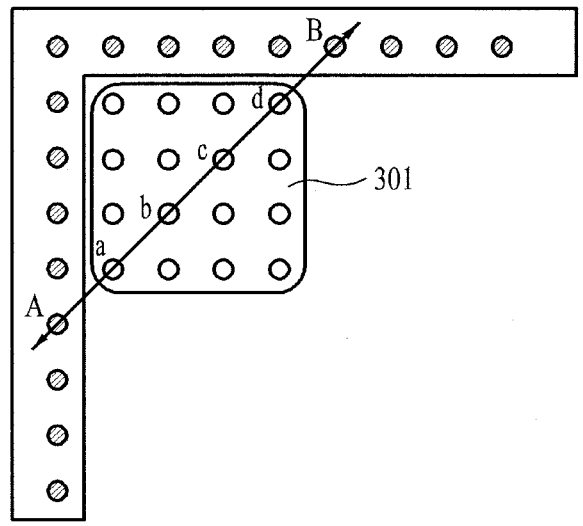
FIG. 3 illustrates a new intra angular mode prediction according to the present invention.

And FIG. 3 provides one example of an intra prediction angle taken from among the range of intra prediction angles illustrated in both FIG. 1 and FIG. 2. In FIG. 3 the 4×4 sample block may be considered the current prediction unit 301. Within the current prediction unit 301 are current prediction samples that need to be prediction processed in order to be reconstructed into the original video data. The current prediction samples are depicted as the empty dots within the current prediction unit 301. According to the exemplary illustration of the intra angular prediction mode of the present invention depicted in FIG. 3, it will now be described how prediction samples a, b, c and d will be prediction processed.

Previously reconstructed samples that neighbor the current prediction unit 301 are represented by the filled in gray dots. In particular, FIG. 3 depicts previously reconstructed samples A belonging to a first block neighboring to the left of the current prediction unit 301, and previously reconstructed sample B belonging to a second block neighboring to the top of the current prediction unit 301. According to the example depicted by FIG. 3, the angular line that runs through reconstructed samples A and B corresponds to the angle of the current intra angular prediction. Reconstructed samples A and B serve as the two reference samples that will be referenced to provide the linear interpolation for predicting the current prediction samples a, b, c and d that lay in the path of the angular line. This is an improvement over the prior art that only utilized a single reference sample to predict such current prediction samples.

Figure 4:
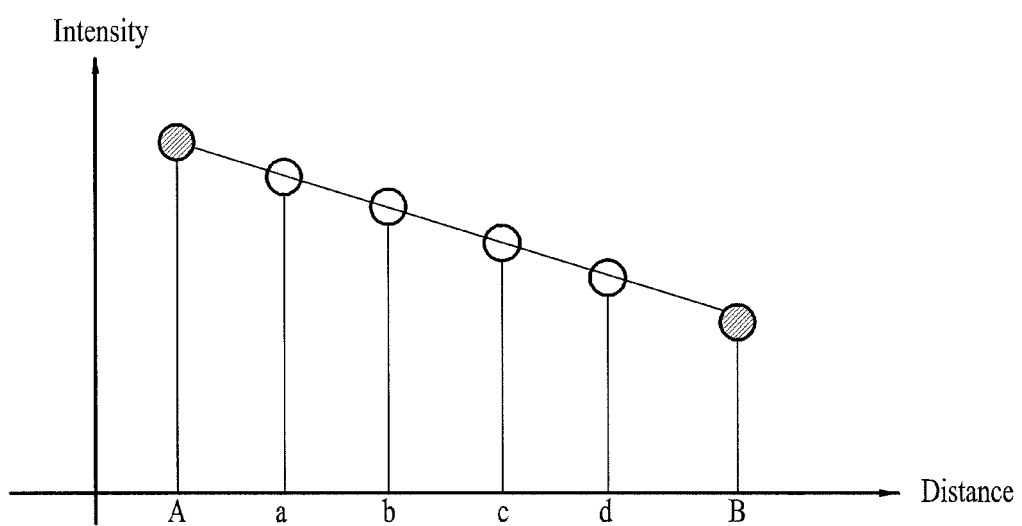
FIG. 4 illustrates a graphical interpretation for weighting a reference sample value against a distance of the reference sample value from a current prediction sample that is being predicted according to the new intra angular mode illustrated by FIG. 3.

In addition, according to the preferred embodiment of the present invention, weighted values for the reference samples A and B will be used when obtaining the linear interpolation to predict each of the current prediction samples. The weighted values will be taken such that the reconstructed sample that is proximately closer to a current prediction sample will be weighted greater than the reconstructed sample that is proximately further away from the current prediction sample. This relationship is graphically represented by FIG. 4.

So looking back at FIG. 3, when performing the intra angular prediction for current prediction sample a, the linear interpolation of reference samples A and B will be processed such that the sample value for reference sample A will be weighed greater than the sample value for reference sample B. This is because current prediction sample a is proximately closer to reference sample A than it is to reference sample B. Likewise, when performing the intra angular prediction for current prediction sample d, the linear interpolation of reference samples A and B will be processed such that the sample value for reference sample A will be weighed less than the sample value for reference sample B. And this is because current prediction sample d is proximately closer to reference sample B than it is to reference sample A. By weighing the values of the reference samples in this manner, the linear interpolation processed according to the preferred embodiment of the present invention can provide a more accurate prediction for each of the individual current prediction samples within the current prediction unit 301.

This weighing principle is able to provide more accurate predictions for each of the current prediction samples within current prediction unit 301 because reference samples that lay proximately closer to a current prediction sample have a higher probability of sharing similar graphical characteristics than reference samples that lay proximately further away.

Figure 5:
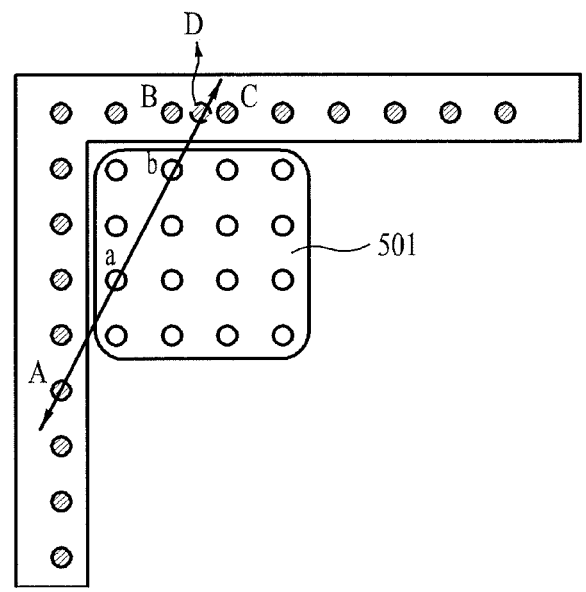
FIG. 5 illustrates a new intra angular mode prediction according to the present invention.

Another aspect of the present invention allows for the intra angular prediction to be processed as illustrated in FIG. 5. FIG. 5 highlights the situation where the angular line that runs through current prediction samples, a and b, does not evenly pass through two previously reconstructed reference samples from neighboring blocks. So although the angular line depicted in FIG. 5 can be seen to run through reference sample A located in the left neighboring block, the angular line does not directly run through a reference sample from the top neighboring block. Instead the angular line is seen to pass through point between previously reconstructed samples B and C, at a point labeled D. Because a reconstructed sample does not actually exist at location D, a sample value for reference sample D must be estimated based off the reconstructed samples B and C that do exist. The estimated sample value for the representation of sample D can be obtained by the following:

$$D=(B+C+1)\gg 1$$

The $\gg$ correlates to a shift 1 function that essentially averages the values of reconstructed samples B and C by dividing it by 2. The plus 1 following the sum of the sample values for reconstructed samples B and C, is added to account for potential rounding errors from the above calculation. In an alternative embodiment of the present invention the plus 1 may be removed when estimating the sample value for reference sample D.

Figure 6:
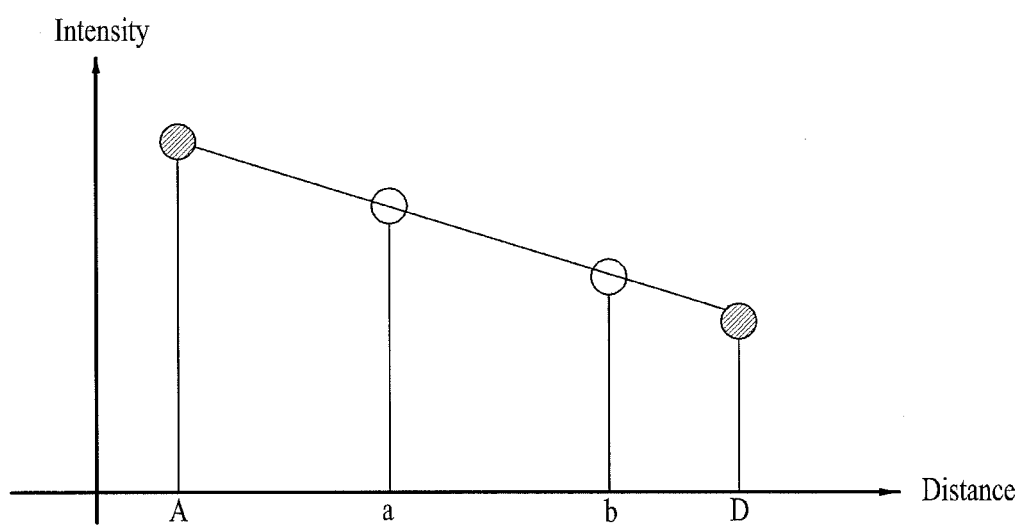
FIG. 6 illustrates a graphical interpretation for weighting a reference sample value against a distance of the reference sample value from a current prediction sample that is being predicted according to the new intra angular mode illustrated by FIG. 5.

After obtaining the reference sample D based on the reconstructed samples B and C, a linear interpolation of reference sample A and reference sample D may be used to process the intra angular prediction of current prediction samples a and b. Like the example given with reference to FIG. 3, the sample values of reference samples A and D as seen in FIG. 5 will be weighted depending on their proximity to the current prediction sample. For example when processing the linear interpolation for predicting current prediction sample b, reference sample D will be weighted greater than reference sample A because reference sample D is proximately closer to current prediction sample b. The weighting function for the example given by FIG. 5 is graphically represented in FIG. 6.

Although FIG. 5 only gives one example of an angular prediction line that requires the generation of a representative reference sample that lays between two actual reconstructed samples, it is within the scope of the present invention to encompass other such instances. When an angular prediction line from among the available angular prediction lines illustrated in FIG. 2 does not run through two actual reconstructed samples as end points, a representation sample value may be estimated similar to how the sample value for D was estimated in FIG. 5. The estimated reference sample may fall in-between two actual reconstructed samples and may be estimated by the function mentioned above. It is also within the scope of the present invention that the reference samples, whether actual or estimated, be referenced from any one of the neighboring blocks that neighbors a current prediction unit. Also, it is within the scope of the present invention that an angular prediction line that corresponds to an intra angular prediction mode of the present invention requires the processing of two estimated reference samples at both ends of the angular prediction line because an actual reference samples does not actually exist at either end.

According to another aspect of the current invention, the new intra angular prediction mode of the present invention may still be processed even when only a single neighboring block is available. FIGS. 3 and 5 describe the new intra angular prediction mode under the assumption that both the left neighboring block and top neighboring block to the current prediction unit were available. Typically, a block is referred to as available when all of the samples located within the block have been prediction processed and reconstructed. Then because all of the samples within the block have been reconstructed, the samples are then said to be available as reference samples when performing the prediction processing for a neighboring current prediction unit. In contrast, there are a variety of situations where such neighboring blocks, and corresponding samples, are considered to be unavailable. Previously, such unavailable samples could not be referenced for predicting a sample within a prediction unit.

However it is an aspect of the present invention to utilize a padding function in order to compensate for unavailable neighboring blocks and samples. Because the linear interpolation according to the new intra angular prediction mode of the present invention requires two reference samples from two separate neighboring blocks, the padding function will be valuable in the cases where only one neighboring block is found to be available. A detailed description of the padding function will be given with reference to the example illustrated in FIGS. 7 and 8.

Figure 7:
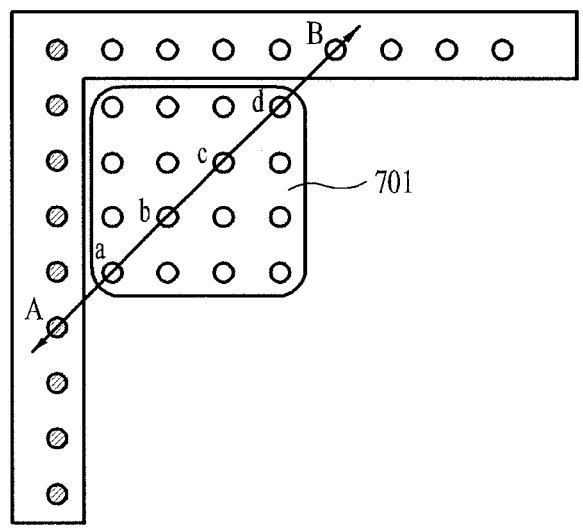
FIG. 7 illustrates a situation where a padding function aspect of the present invention may be required.

FIG. 7 illustrates a situation where the padding function, that is an aspect of the present invention, may be required. In this case, the filled in gray dots represent previously reconstructed samples that are considered to be available, and the empty dots represent samples that are considered to be unavailable. The example shown in FIG. 7 considers the same angular prediction line as shown in FIG. 3. However, in FIG. 7 the empty dots above the current prediction unit 701 represents samples from the top neighboring block are unavailable, whereas they were available in the example of FIG. 3. Although reference sample A can be reference from the left neighboring block that has been reconstructed, the linear interpolation according to the new intra angular prediction mode of the present invention still requires a second reference sample at the other end of the angular line.

Figure 8:
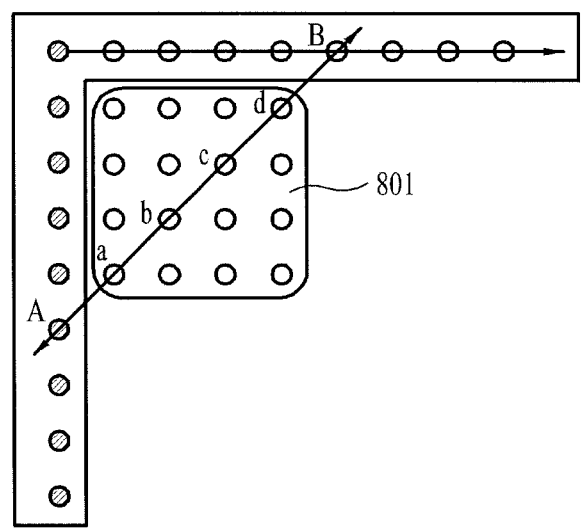
FIG. 8 illustrates how a padding function aspect of the present invention may be applied.

FIG. 8 then illustrates the padding function that is applied according to an aspect of the present invention that will provide the second reference sample B. The value for the previously reconstructed sample P that is included as part of the left neighboring block is taken and padded horizontally to the right. By padding the samples of the top neighboring block that were seen to be previously unavailable in FIG. 7 with the value for previously reconstructed sample P, the reference sample B needed for the linear interpolation of the new intra angular prediction mode of the present invention may still be obtained. The reconstructed sample P from the left neighboring block is a good candidate for padding the samples of the top neighboring block that were unavailable because of its close proximity to the top neighboring block. It can be seen from FIG. 8 that previously reconstructed sample P is closest in proximity to the top neighboring block.

Figure 9:
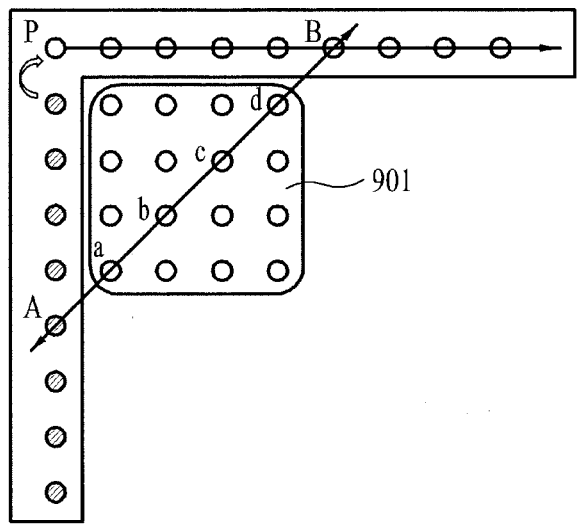
FIG. 9 illustrates another example for how a padding function aspect of the present invention may be applied.

FIG. 9 illustrates an alternative scenario where sample P is not included as part of the left neighboring block that also includes reference sample A. In this scenario, sample P may actually belong to a top-left neighboring block. In such a scenario, FIG. 9 illustrates that the previously reconstructed sample from the left neighboring block that is closest in proximity to the top neighboring block may be utilized to pad the samples of the top neighboring block that are unavailable. By padding the samples in the top neighboring block based on a previously reconstructed sample from the left neighboring block, a second reference sample required for the linear interpolation of the intra angular mode prediction according to the present invention may still be accomplished.

Although FIGS. 8 and 9 explained the cases where samples from the left neighboring block were available for referencing and it was the top neighboring block that was unavailable, it is well within the scope of the present invention to account for the reverse scenario. Therefore it is within the scope of the present invention to pad samples in the left neighboring block that are unavailable, using a previously reconstructed sample from the top neighboring block that is available.

It is a further aspect of the present invention to make neighboring blocks that belong to separate slices from the slice including the current prediction unit available when processing intra angular prediction modes. This aspect of the present invention is applicable to all intra prediction modes mentioned in this application. Therefore any mention of neighboring blocks within this disclosure may refer to a neighboring block that belongs to a separate slice from the slice including the current prediction unit.

Figure 10:
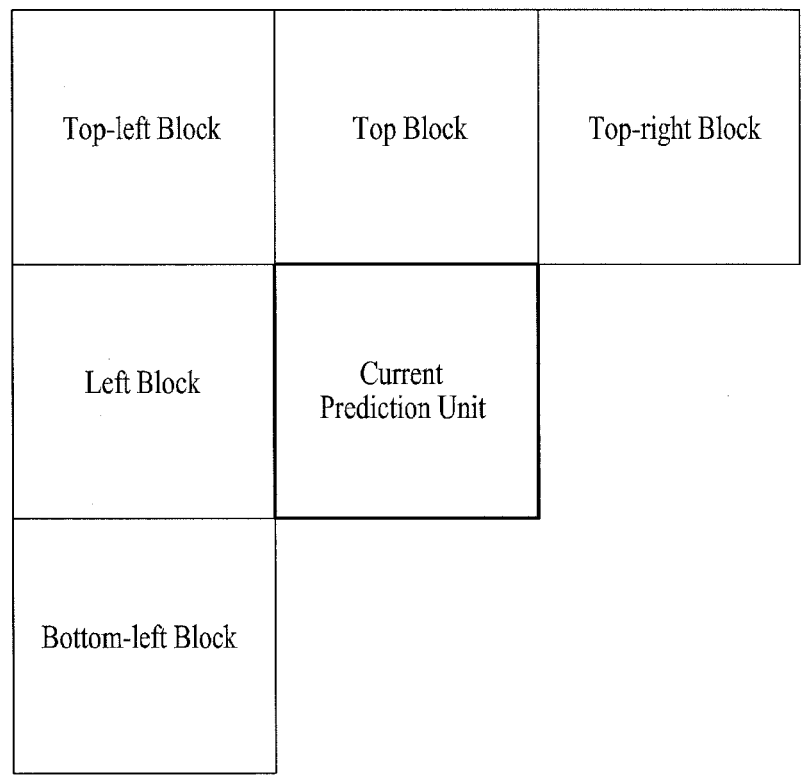
FIG. 10 illustrates a current prediction unit's spatial relationship to neighboring blocks.

It is also a further aspect of the present invention to not only make samples belonging to neighboring blocks to the immediate left and top of the current prediction available for referencing for intra prediction, but also samples belonging to neighboring blocks adjacent to the current prediction unit in all directions as illustrated in FIG. 10. FIG. 10 illustrates that samples from neighboring blocks to the bottom-left, left, top-left, top and top-right of the current prediction block may be referenced for predicting the current prediction unit. This aspect of the present invention is an improvement over the previous intra prediction modes that made certain neighboring blocks unavailable for referencing when predicting a current prediction mode. Also, this aspect of the current invention will be explained with reference to FIGS. 11 to 16, and is understood to be applicable for all intra prediction modes described according to this invention.

Figure 11:
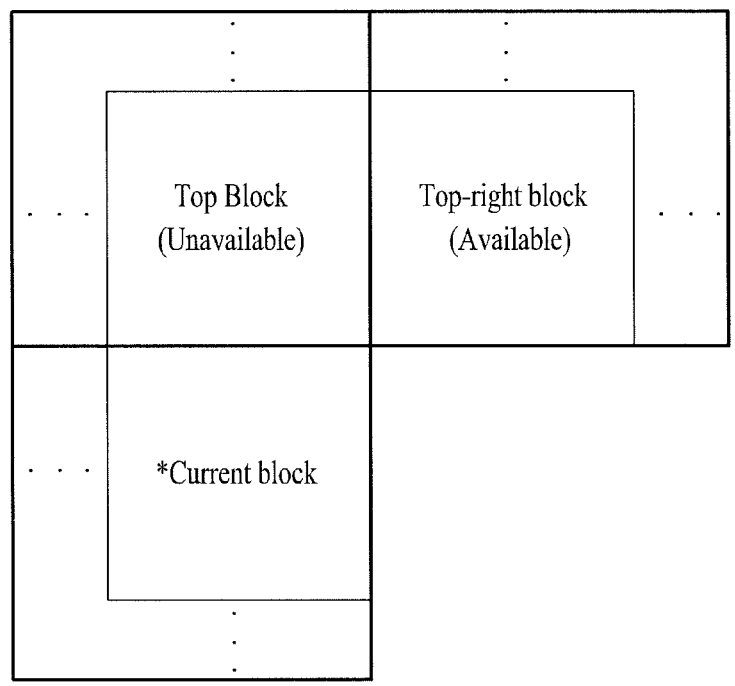
FIG. 11 illustrates a spatial relationship for neighboring slices where one of the slices includes a current block.

FIG. 11 illustrates an example where the current block containing a current prediction unit is found in slice 3. Slice 1 neighboring to the top of Slice 3 contains the top neighboring block that is unavailable, and Slice 2 to the top-right of Slice 3 contains the top-right block that is available.

Figure 12:
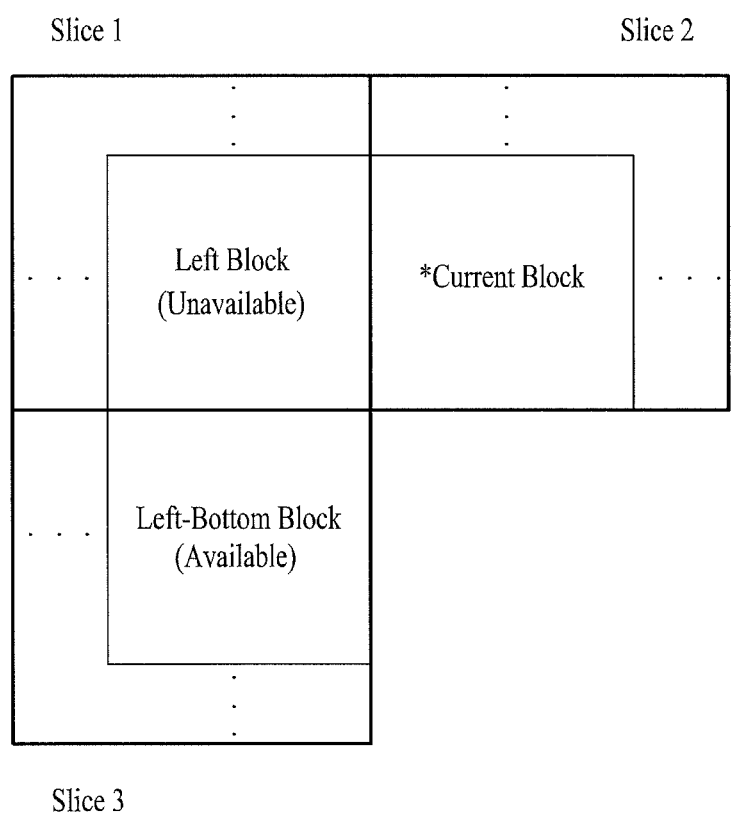
FIG. 12 illustrates another example of a spatial relationship for neighboring slices where one of the slices includes a current block.

FIG. 12 illustrates another example where now the current block containing a current prediction unit is found in Slice 2. Slice 1 neighboring to the left of Slice 2 contains the left block that is unavailable, and Slice 3 neighboring to the left-bottom of Slice 2 contains the left-bottom block that is available.

Figure 13:
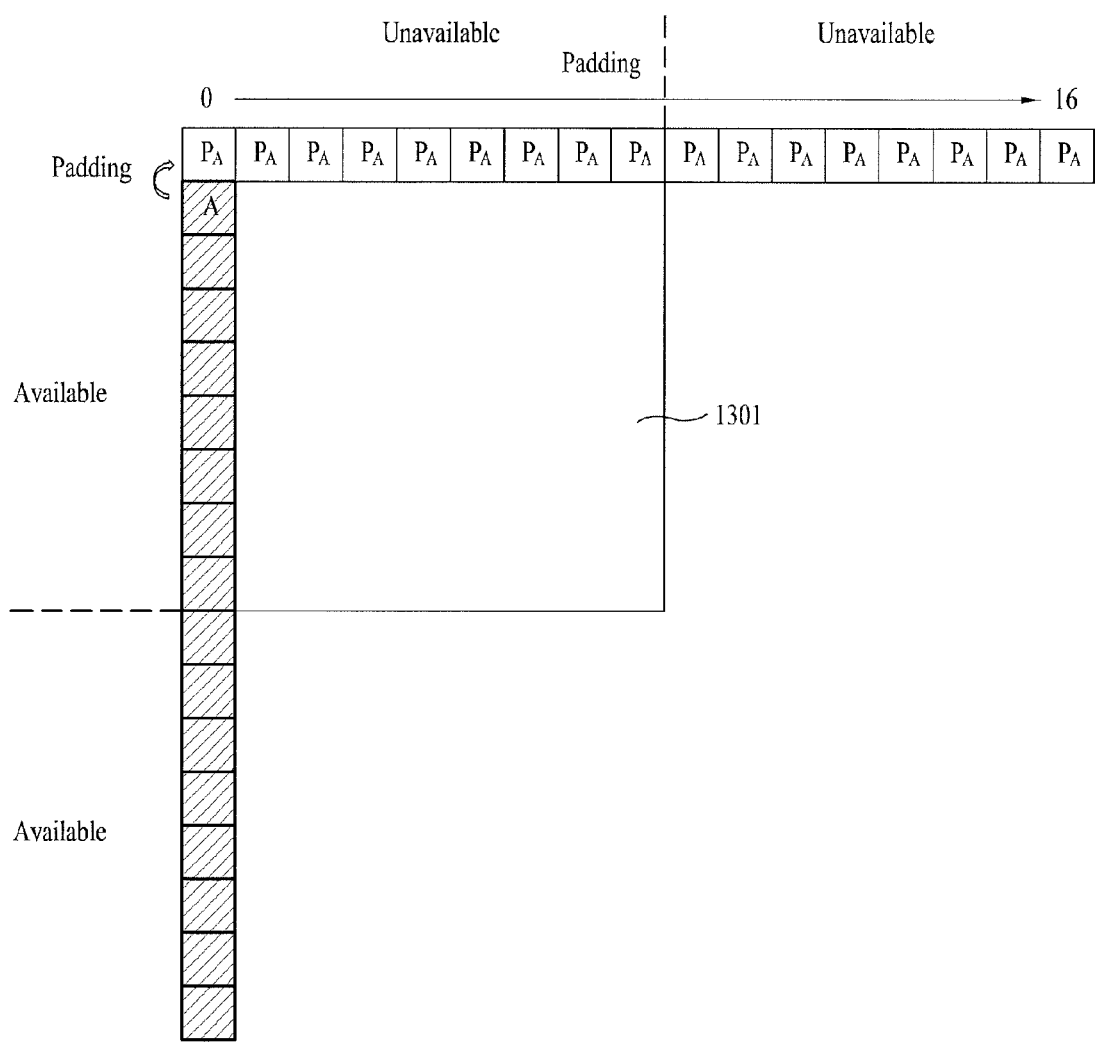
FIG. 13 illustrates an example for padding sample values for use as reference values of a neighboring block according to the present invention.

FIG. 13 offers a close-up view where, with respect to the current prediction unit 1301, the neighboring bottom-left and neighboring left blocks are available, and the neighboring top and neighboring top-right blocks are unavailable. The samples belonging to the neighboring left and neighboring bottom-left blocks have been shaded to indicate these samples have previously been reconstructed and are available for reference when making an intra angular mode type prediction of the current prediction unit 1301. The samples belonging to the neighboring top and neighboring top-right blocks have not been shaded because these samples are considered to be unavailable for referencing when predicting the current prediction unit 1301.

In the scenario depicted by FIG. 13, the previously reconstructed sample of the neighboring left block that is proximately closest to the neighboring top block will be padded into a sample space belonging to the neighboring top block. So in FIG. 13, previously reconstructed sample A is padded into the sample space located directly above it. Then this padded sample value, as indicated by $P_A$, is padded horizontally to the right in order to assign a sample value for each of the samples belonging to the neighboring top and neighboring top-right blocks that were previously considered to be unavailable. By padding the samples of the neighboring top and neighboring top-right blocks with the padded sample value of $P_A$, prediction processing according to any of the available intra prediction modes can now be achieved. The only difference is that instead of an actual reconstructed sample value being referenced for prediction, a padded sample value taken from one of the available neighboring blocks is used in its place. This aspect of the present invention offers an improvement over simply making certain intra prediction modes not available when the required reference sample is unavailable.

It is noted that although FIG. 13 depicts the situation where the top-left corner neighboring sample at index 0 is assumed to be part of the neighboring top block, in the situation where this is not the case it is within the scope of the present invention to pad the reconstructed value of sample A directly into the nearest sample of the neighboring top block that is unavailable. Then in such a situation, $P_A$ may be first padded into the sample of the top block located at index 1 instead of index 0. The horizontal padding to the right in order to pad-in the rest of the neighboring samples remains the same. As another alternative, the neighboring sample location identified by index 0 may actually belong to an available neighboring top-left block. If this is the case, this would indicate the sample located at index 0 is actually an available reference sample belonging to the neighboring top-left block. Then according to this alternative, the previously reconstructed sample located at index 0 may be assigned as $P_A$ and used to horizontally pad the neighboring samples of the neighboring top block and neighboring top-right block to the right that are unavailable.

Figure 14:
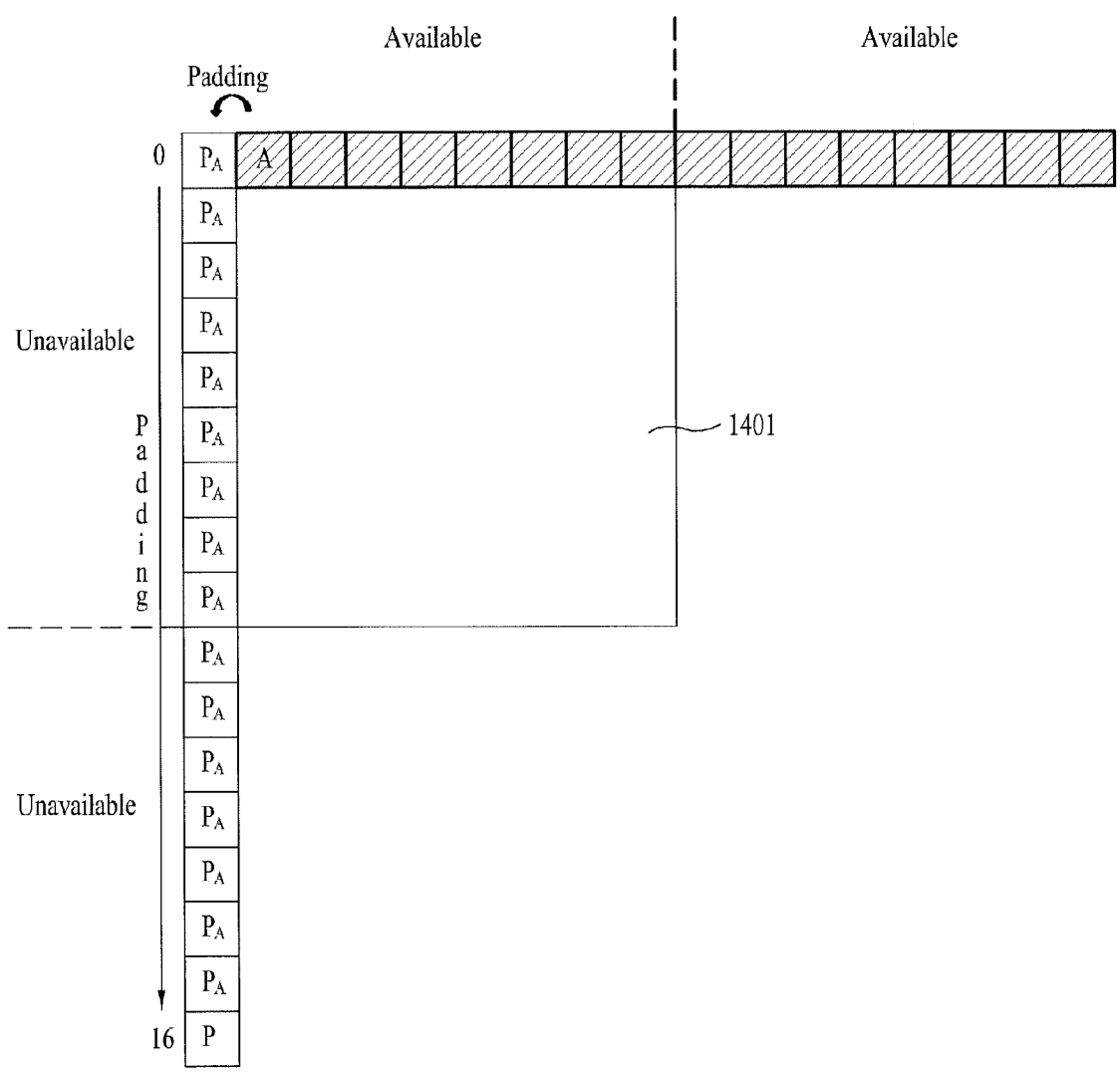
FIG. 14 illustrates another example for padding sample values for use as reference values of a neighboring block according to the present invention.

FIG. 14 illustrates the example where the neighboring top and neighboring top-right blocks are available, and the neighboring left and neighboring bottom-left blocks are unavailable. It is noted that all directional references are made in relation to the current prediction unit 1401. Similar to the situation illustrated in FIG. 13, in FIG. 14 a previously reconstructed sample from an available neighboring blocks that is proximately closest to the neighboring block that is unavailable is padded into a first sample location of the neighboring block that is unavailable. In the situation illustrated in FIG. 14, previously reconstructed sample A is first padded into the sample location of neighboring left block identified by index 0. Then this padded value, $P_A$, is padded down to fill in the reconstructed sample values for neighboring samples belonging to the neighboring left and neighboring bottom-left blocks that are unavailable. These padded values, along with any of the actual reconstructed samples from the available neighboring blocks to the top and top-right, can be utilized to perform prediction processing according to any of the intra prediction modes of the present invention.

It is noted that although FIG. 14 depicts the situation where the top-left most corner sample at index 0 is assumed to be part of the neighboring top block, in the situation where this is not the case it is within the scope of the present invention to pad the reconstructed value of sample A directly into the nearest sample of the neighboring top block. Then in such a situation, $P_A$ may be first padded into the sample of the left block located at index 1 instead of index 0. The vertical padding downward in order to pad-in the rest of the neighboring samples remains the same. As another alternative, the sample location identified by index may actually belong to an available neighboring top-left block. If this is the case, this would indicate the sample located at index 0 is actually an available reference sample belonging to the neighboring top-left block. Then according to this alternative, the previously reconstructed sample located at index 0 may be assigned as $P_A$ and used to downwardly pad the neighboring samples of the neighboring left block and neighboring bottom-left block.

Figure 15:
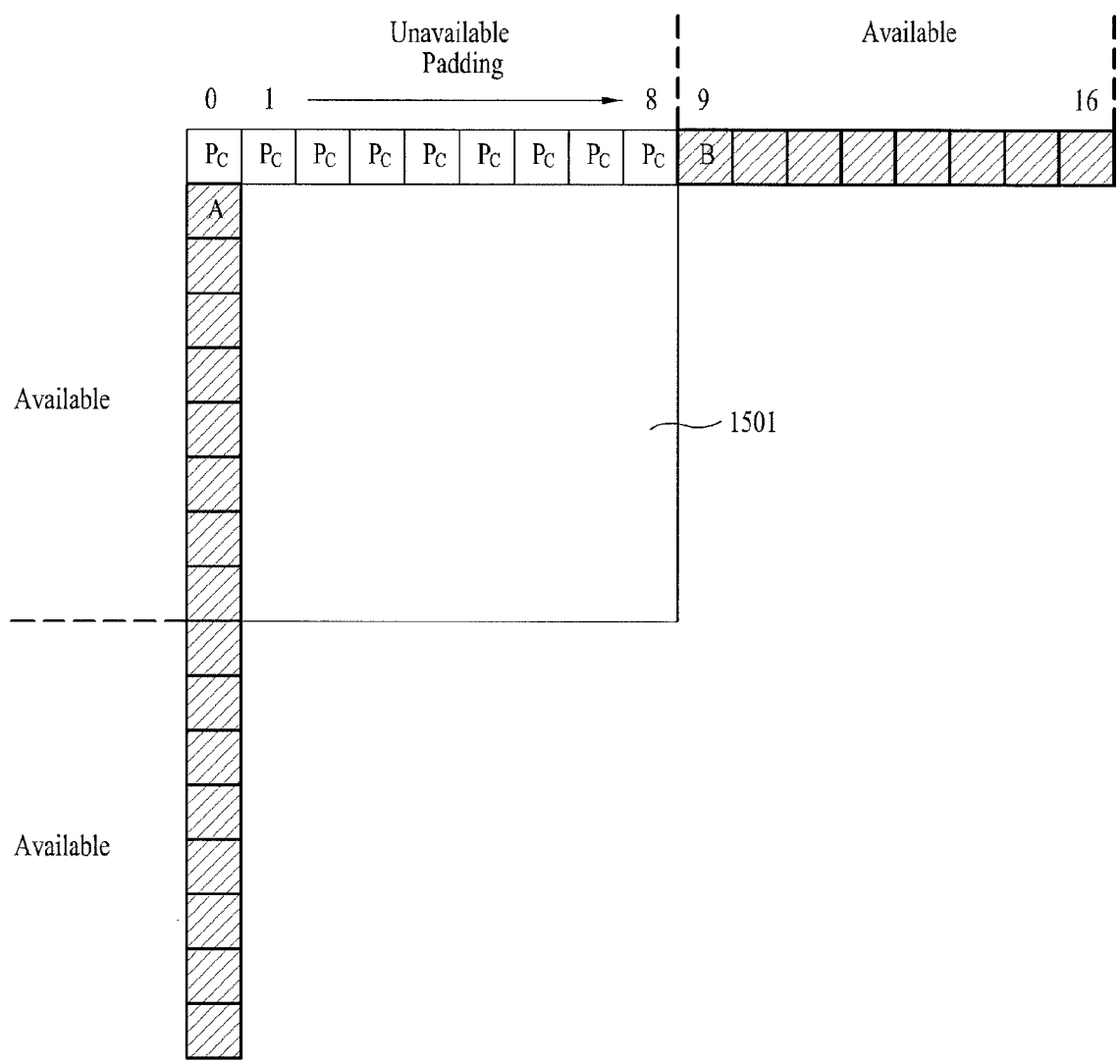
FIG. 15 illustrates another example for padding sample values for use as reference values of a neighboring block according to the present invention.

FIG. 15 illustrates an example where the neighboring left block, neighboring bottom-left block and neighboring top-right block are all available with previously reconstructed samples. However, the neighboring top block is seen to be unavailable. It is noted that all directional references are made in relation to the current prediction unit 1501. In this scenario, padding of the neighboring samples to the top of the current block may be done according to an interpolation of two previously reconstructed samples taken from separate available neighboring blocks. FIG. 15 specifically identifies sample A from the neighboring left block and sample B from the neighboring top-right block. Both of these samples A and B have been previously reconstructed and are considered to be available. First, reference sample A and reference sample B are interpolated to obtain the reference sample value $P_C$. The reference sample value $P_C$ is then padded throughout the previously unavailable samples from the neighboring top block. This is depicted by the padding of the reference samples with index 0 to 8 of the neighboring top block with the reference sample value $P_C$.

As an alternative, instead of using the interpolation of reference samples A and B to pad-in the reference sample values for sample 0 to 8 in the neighboring top block, the sample value for either one of reference samples A and B may be used to directly pad samples 0 to 8 of the neighboring top block. While this alternative is not directly illustrated by FIG. 15, it is within the scope of the present invention to use the sample value of either reference sample A or B to pad in the reference sample value of samples 0 to 8 of the neighboring top block.

As another alternative, the reference sample located at index 0 may not actually be included as part of the neighboring top block. In such a scenario where the reference sample located at index 0 actually belongs to a neighboring top-left block, the padding of the unavailable neighboring top block will begin with the sample located at index 1 instead of index 0. This is true for the case where the unavailable samples from the neighboring top block are padded with a value obtained from the interpolation of reference samples A and B, or where the unavailable samples are padded simply by copying the sample value from either one of reference samples A or B.

Figure 16:
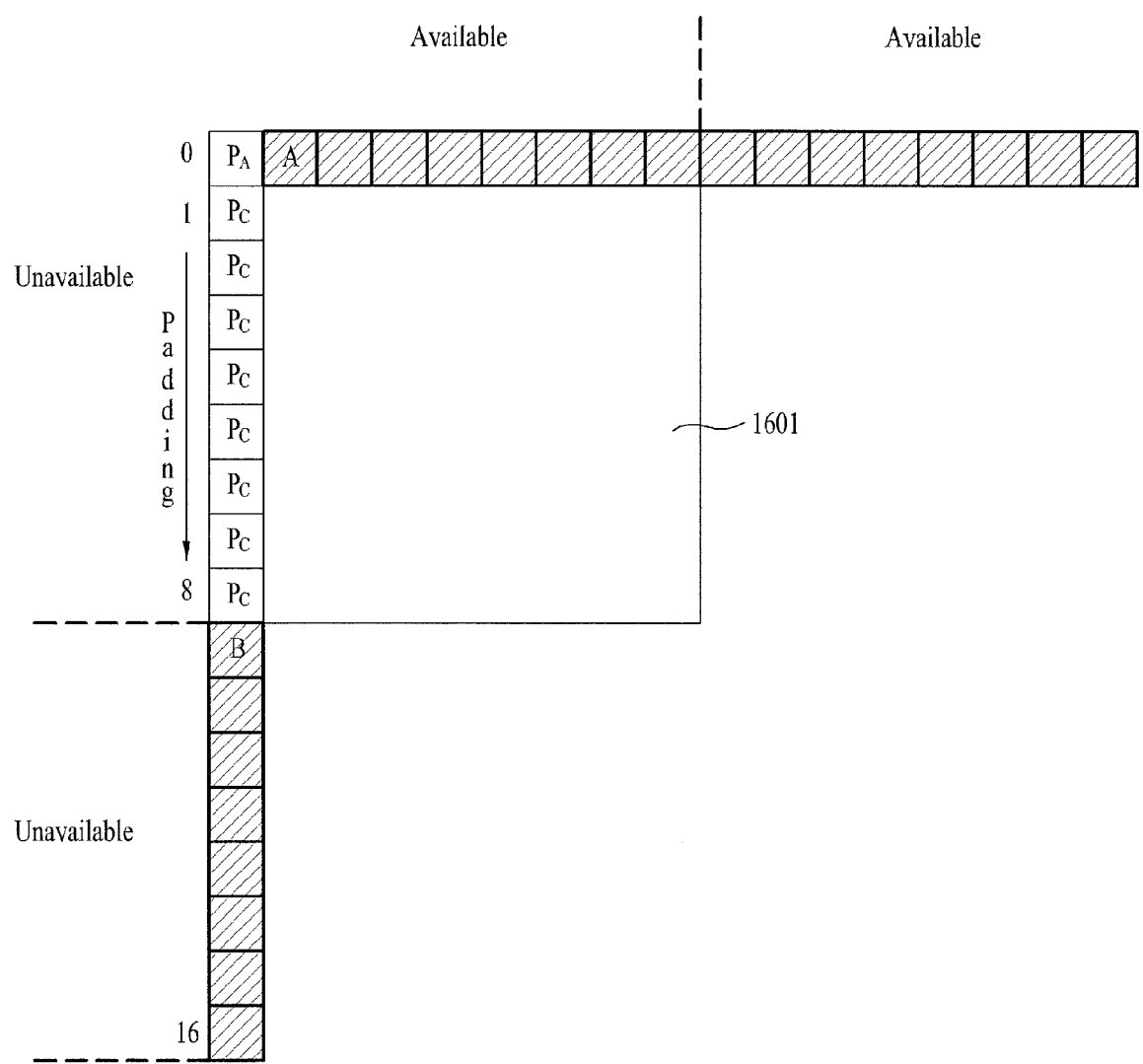
FIG. 16 illustrates another example for padding sample values for use as reference values of a neighboring block according to the present invention.

FIG. 16 illustrates an example where the neighboring bottom-left block, neighboring top block and neighboring top-right blocks are all available with previously reconstructed samples. However, the neighboring left block is seen to be considered unavailable. All directional references are made in relation to the current prediction unit 1601. In this scenario, padding of the unavailable neighboring samples to the left of the current block may be done according to an interpolation of two previously reconstructed samples taken from separate available neighboring blocks. FIG. 16 specifically identifies available reference sample A from the neighboring top block and available reference sample B from the neighboring bottom-left block. Then first an interpolation of the sample values that correspond to reference samples A and B is determined to obtain the reference sample value $P_C$. Then the reference sample value $P_C$ that is obtained from the interpolation of reference samples A and B is used to pad-in the unavailable samples that belong to the neighboring left block. These unavailable neighboring left block samples are indicated by indexes 0 to 8.

As an alternative, instead of padding the unavailable samples of the neighboring left block with the interpolation of reference samples A and B, the sample value corresponding to either one of reference samples A or B may be used. So according to this alternative, the sample value of either reference sample A or B may simply be copied to pad-in the unavailable samples of the left neighboring block.

As another alternative, the reference sample located at index 0 may not actually be included as part of the neighboring left block. In such a scenario where the reference sample located at index 0 actually belongs to a neighboring top-left block, the padding of the unavailable neighboring left block will begin with the sample located at index 1 instead of index 0. This is true for the case where the unavailable samples from the neighboring left block are padded with a value obtained from the interpolation of reference samples A and B, or where the unavailable samples are padded simply by copying the sample value from either one of reference samples A or B.

Figure 17:
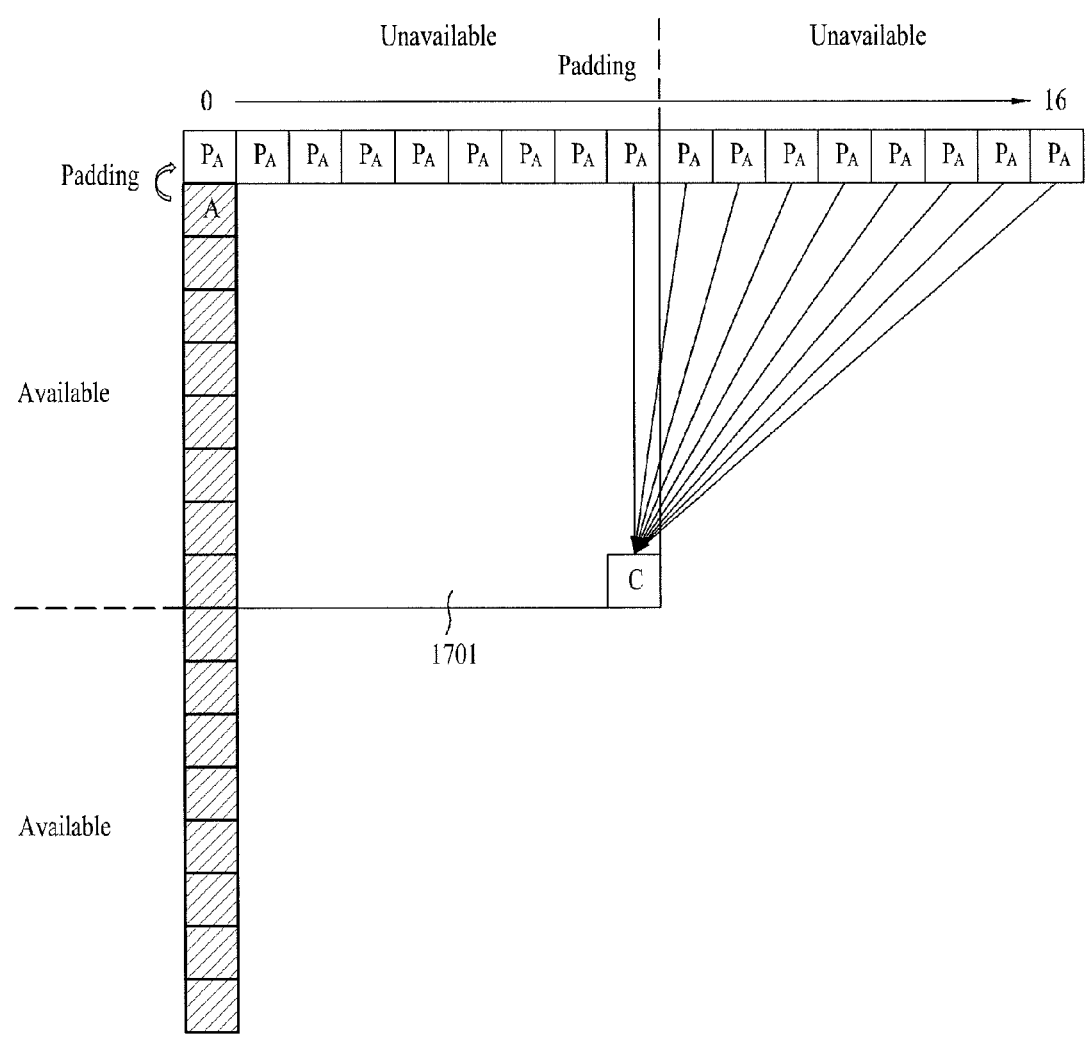
FIG. 17 illustrates a scenario where a padding function that is applied according to the present invention creates a redundancy of intra prediction modes that may be processed to predict a single sample.

Another aspect of the present invention introduces a solution for dealing with the redundancies of intra prediction modes that causes the same prediction results to be made due to the padding function applied according to the present invention. For example, when the reconstruction value $P_A$ is horizontally padded all along the neighboring samples that belong to the top block and top-right block in relation to the current prediction unit 1701 as illustrated in FIG. 17, there are a redundancy of intra prediction modes that need to be signaled for predicting the current prediction sample C. Because $P_A$ has been horizontally padded all along the top neighboring samples, the prediction result for current prediction sample C according to the intra vertical prediction mode that references the sample located at index 8 will be the same as the predictions according to each of the intra angular prediction modes that reference the samples located at indexes 9-16. The prediction results will be the same for each of the 9 intra prediction modes because they all reference the same reference sample value corresponding to $P_A$. This is due to the padding of reference sample value $P_A$.

Therefore when the padding function results in a plurality of intra prediction modes that will all result in the same prediction of a current prediction sample, the present invention will be able to recognize that it is only necessary to identify one of the intra prediction modes from among the plurality of redundant intra prediction modes. So in the scenario depicted in FIG. 17, instead of identifying all of the intra vertical prediction mode and intra angular prediction modes that correspond reference samples at indexes 9-16, only one of the intra prediction modes may be identified when signaling the prediction mode for the current prediction sample C. The proper intra prediction mode that corresponds to current prediction sample C is identified during the encoding process by an encoding unit. In other words, when the application of the padding function results in a plurality of redundant intra prediction modes that would all result in the same prediction for the current prediction sample C, the present invention is able to recognize such a scenario and only make available a single intra prediction mode out of the plurality of intra prediction modes that would all result in the same prediction value for the current prediction sample C. The intra prediction mode chosen to be signaled in such a scenario may be random, or simply the intra prediction mode that has the lowest value in terms of intra prediction mode values assigned to each of the intra prediction modes.

The benefit of only making a single intra prediction mode available in such a scenario where there are redundancies of intra prediction modes that all result in a same prediction value for any one current prediction sample becomes apparent when considering the information that must be transmitted from an encoding unit side. The encoding unit is responsible for first taking original RGB video data and encoding it into prediction units for video data compression. Each prediction unit has a specific intra prediction mode applied to it during the encoding process. Then in order to ensure a receiving decoding unit re-applies the same intra prediction mode prediction process to each received prediction unit, the encoding unit additionally assigns identifying information to each prediction unit that identifies which intra prediction mode should be applied to each prediction unit of digital video data by the decoding unit. Each prediction unit received by the decoding unit is decoded by re-applying the proper intra prediction mode processing as identified from the received identifying information. Now depending on the number of available intra prediction modes that may be applied to a given prediction unit, the length of the binary codeword identifying each intra prediction mode will vary. For example, if there are five intra prediction modes available to prediction process a particular prediction unit, a maximum binary bit codeword length for identifying each of the five intra prediction modes may be 3-bits (eg. 01, 10, 110, 101, 011). By getting rid of just one of the available five intra prediction modes so that there are now four available intra prediction modes that need to be identified, the maximum binary bit codeword length can be shortened to a maximum length of 2 bits (eg. 0, 1, 01, 10).

Going back to the scenario depicted in FIG. 17, the same prediction will result on current prediction unit 1701 whether an intra vertical prediction mode is applied or any of the intra angular prediction modes corresponding to the neighboring samples located at indexes 9-16 is applied. Therefore, when an encoding unit is preparing the current prediction unit 1701 for data compression, the encoding unit does not need to separately identify the intra angular prediction modes. Instead, by only identifying the single intra vertical prediction mode, a direct reduction of the maximum binary bit codeword length needed to identify the intra prediction modes to be applied may be achieved. This is an added benefit of the padding function describes as an aspect of the present invention. Any reduction of binary bit codeword lengths is desirable for digital video data compression. It should be noted that although the intra vertical prediction mode was selected to be the single intra prediction mode signaled, any of the available intra prediction modes may have been signaled.

According to yet another aspect of the present invention, a new combined intra prediction (CIP) mode is offered. This new CIP mode offers a new method for predicting a current prediction unit by combining a weighted intra angular prediction with a weighted local mean prediction of previously reconstructed samples.

Figure 18:
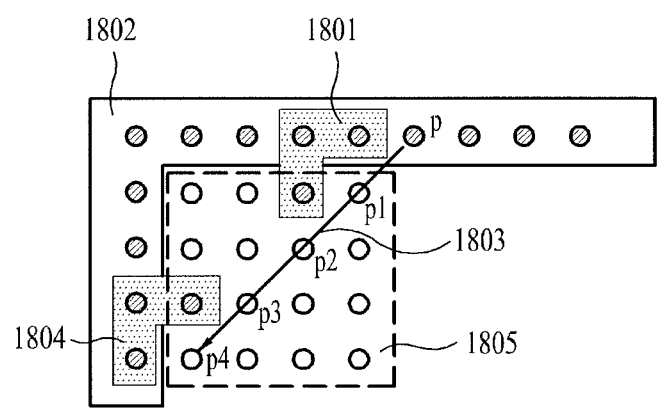
FIG. 18 illustrates a new intra combined mode prediction according to the present invention.

FIG. 18 illustrates an example for the prediction processing according to the new CIP mode of the present invention. The blank dots represent samples of the current prediction unit 1805 that have not yet been predicted, and the filled-in dots 1802 represent samples from blocks neighboring the current prediction unit 1805 that have been previously predicted and reconstructed. A first local mean 1801 is represented in FIG. 18 by a grouping of two previously reconstructed samples from a top neighboring block and a previously reconstructed block from the current prediction unit 1805. A fourth local mean 1804 is represented by a grouping of two previously reconstructed samples from a left neighboring block and a previously reconstructed sample from the current prediction unit 1805.

The first local mean 1801 is an average sample value of the three previously reconstructed samples as grouped in FIG. 18. Likewise, the fourth local mean 1804 is an average sample value of the three previously reconstructed samples as grouped in FIG. 18. In order to obtained the CIP mode prediction of current prediction sample p1 within the current prediction unit 1805, a weighted value of the first local mean 1801 is combined with a weighted value of an intra angular prediction 1803 referenced from previously reconstructed sample P. Similarly, in order to obtain the CIP mode prediction of current prediction sample p4 within the current prediction unit 1805, a weighted value of the fourth local mean 1804 is combined with a weighted value of an intra angular prediction 1803 referenced from previously reconstructed sample P.

The weighted value applied to the intra angular prediction 1803 becomes greater as the current prediction sample being predicted is proximately closer to the reference sample P, and becomes smaller as the current prediction sample that is being predicted is proximately further away from the reference sample P. The CIP mode prediction on each of the current prediction samples p1 through p4 seen in FIG. 18 can thus be represented by the following relationship:

$$p1 = [w1*(\text{intra angular prediction})] + [(1-w1)*(\text{first local mean})]$$

$$p2 = [w2*(\text{intra angular prediction})] + [(1-w2)*(\text{second local mean})]$$

$$p3 = [w3*(\text{intra angular prediction})] + [(1-w3)*(\text{third local mean})]$$

$$p4 = [w4*(\text{intra angular prediction})] + [(1-w4)*(\text{fourth local mean})]$$

And according to the present invention, the weighted values, w1-w4, may take on the following values:

|    | Example 1 | Example 2 |
|----|-----------|-----------|
| w1 | 1         | 4/5       |
| w2 | 2/3       | 3/5       |
| w3 | 1/3       | 2/5       |
| w4 | 0         | 1/5       |

As can be determined from above, as the current prediction sample gets farther away from the reference sample P from which the intra angular prediction component is obtained, the weight of the local mean component becomes stronger for the CIP prediction of the current prediction sample. And as the current prediction sample gets farther away from the reference sample P from which the intra angular prediction component is obtained, the weight of the intra angular prediction component becomes weaker for the CIP prediction of the current prediction sample. This is due to the assumption that the intra angular prediction component provides a more accurate prediction of the current prediction sample as the current prediction sample is proximately closer to the reference sample P.

Figure 19:
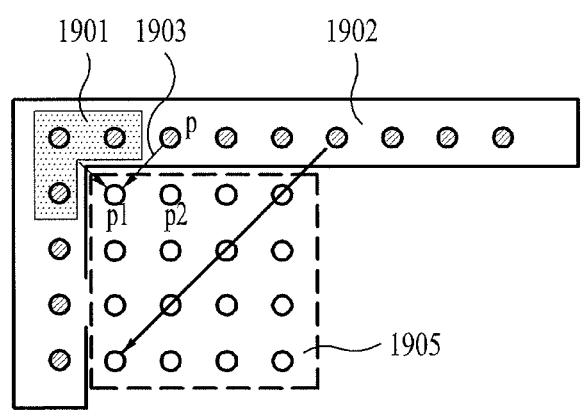
FIG. 19 illustrates a new intra combined mode prediction according to the present invention.

According to a first embodiment of the CIP prediction mode of the present invention, the first current prediction sample of the current prediction unit 1905 to be predicted will be the top left-most current prediction sample p1 as illustrated by FIG. 19. In this case, the local mean 1901 for predicting the first current prediction sample, p1, is comprised of three previously reconstructed samples from neighboring blocks 1902. This is the only instance where all three reference samples needed for the local mean 1901 will come from neighboring blocks. The intra angular prediction is also taken from a previously reconstructed reference sample, P, of a neighboring block. The CIP mode prediction for current prediction sample, p1, will then be the combination of a weighted value for the local mean 1901 combined with a weighted value for the intra angular prediction 1903 referenced from the reference sample P. The relationship can be seen by the following:

$$p1 = [w1*(\text{intra angular prediction})] + [(1-w1)*(\text{local mean})]$$

The remaining current prediction samples within the current prediction unit 1905 that have not been reconstructed may be predicted according to the CIP prediction mode in a raster scan motion sequence.

As an alternative, instead of predicting p1 according to the CIP mode, p1 may first be predicted according to any other available intra prediction mode. Then after p1 has been predicted and reconstructed, p1 may be used as part of the local mean calculated for the first CIP prediction starting with current prediction sample p2.

Figure 20:
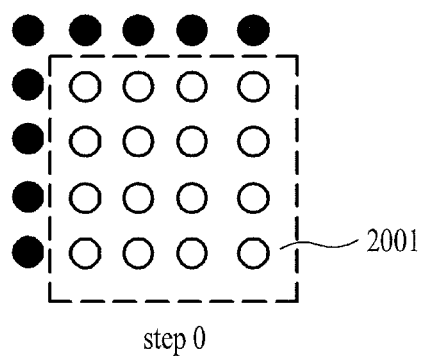
FIG. 20 illustrates a sequence for processing a new intra combined mode prediction according to the present invention.
Figure 20:
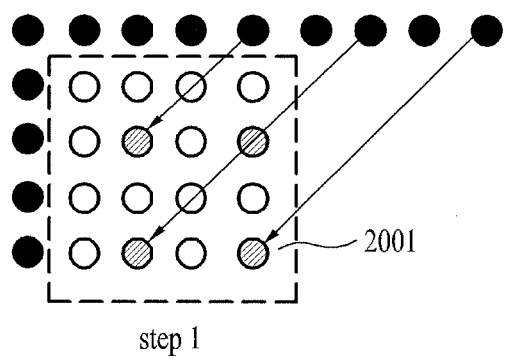
Figure 20:
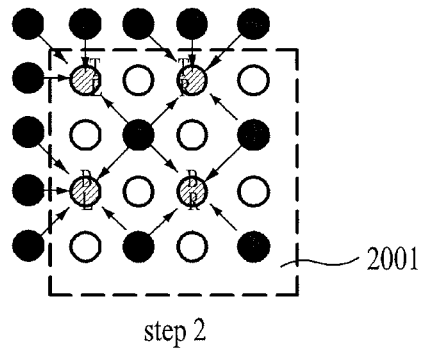
Figure 20:
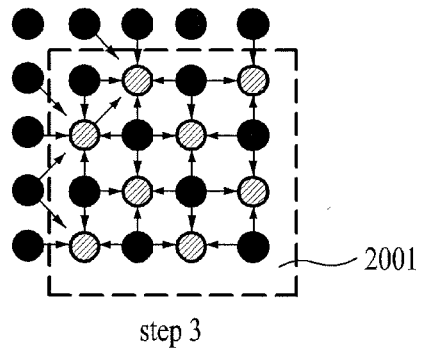

According to a second embodiment of the CIP mode prediction of the present invention, the scenario seen in step 0 in FIG. 20 begins with a current prediction unit 2001 that includes empty dots representing current prediction samples that need to be predicted and reconstructed. Adjacent to the current prediction unit 2001 are filled in black dots that represent samples from neighboring blocks that have previously been reconstructed. Then in step 1, four current prediction samples are first selected for prediction according to intra angular prediction modes referenced from neighboring block's previously reconstructed samples. These current prediction samples that are selected to be predicted are represented by the filled in gray dots. It is noted that although FIG. 20 illustrates one instance of four current prediction samples being selected to be predicted, it is within the scope of the present invention to select any four samples within the current prediction unit 2001. Also, although FIG. 20 illustrates using the intra angular prediction mode to initially predict the first four samples within the current prediction unit 2001, it is within the scope of the present invention to utilize any available intra prediction mode to predict the initial four samples within the current prediction unit 2001. For example an intra horizontal mode or intra vertical mode prediction may be applied.

After performing the prediction processing on the four selected current prediction samples in step 1, the four samples are immediately reconstructed. These reconstructed samples within the current prediction unit 2001 are represented by the four filled in black dots in step 2. It is during step two that the first prediction according to the CIP mode prediction will be processed. Four samples within the current prediction unit 2001, as represented by the filled in gray dots in FIG. 20, are selected to be processed according to the CIP mode prediction of the second embodiment. For the CIP mode prediction as seen in step 2, not only are the reconstructed samples from the neighboring blocks available for referencing, but so too are the four previously reconstructed samples within the current prediction unit 2001 itself.

According to this second embodiment of the CIP prediction mode, a weighted value from a local mean will still be combined with a weighted value from an intra angular prediction. However, according to this second embodiment of the CIP prediction mode the local mean may be comprised of the average sample values from at least three reconstructed samples adjacent to the current prediction sample. And the intra angular prediction may be referenced from at least one previously reconstructed sample. This entails that more than three reference samples may be referenced when calculating the local mean, and more than one intra directional prediction may be included as the intra directional prediction component of the CIP prediction.

When looking at the top left current prediction sample (TL) that is being predicted according to the CIP mode in FIG. 20, in a first instance the local mean may be calculated from the values of the previously reconstructed samples to the left, top-left, and top of TL. This leaves the intra directional prediction component to come from the previously reconstructed sample to the bottom-right of TL. Or looking at the same top left current prediction sample (TL) in step 2, the local mean may be calculated from the values of the previously reconstructed samples to the bottom-right, left and top-left of TL. Then in this second instance, this leaves the intra directional prediction to come from the previously reconstructed sample to the top of TL.

As another example, looking at the top-right sample (TR) among the four selected current prediction samples within the current prediction unit 2001 in step 2, the local mean may be calculated from the values of the previously reconstructed samples to the bottom-left, top-left, top and top-right of TR. Then the intra directional prediction is left to come from the reconstructed sample to the bottom-right of TR. In this example the values from four previously reconstructed samples are used to calculate the local means.

Step 3 then illustrates the four selected samples from within the current prediction unit 2001 that were selected for CIP prediction in step 2, being fully reconstructed as represented by the filled in black dots in step 3. Now with all of the reconstructed samples from the neighboring blocks and within the current prediction unit 2001 itself available to be reference for CIP prediction, the remaining current prediction samples can be predicted according to the CIP mode. Therefore, as long as there are at least three reconstructed samples that are adjacent to a current prediction sample and at least one reconstructed sample from which to process an intra directional prediction on the current prediction sample, the current prediction sample can be processed according to this third embodiment of the CIP mode of the present invention.

It is also within the scope of the present invention to utilize more than just the reconstructed samples to the immediate left, top-left and top of a current prediction sample when obtaining the local mean for the CIP prediction mode according to all embodiments of the present invention. It is within the scope of the present invention to make available all reconstructed samples that are adjacent to the current prediction sample when calculating the local mean for use in all the embodiments of the CIP mode of the present invention.

Figure 21:
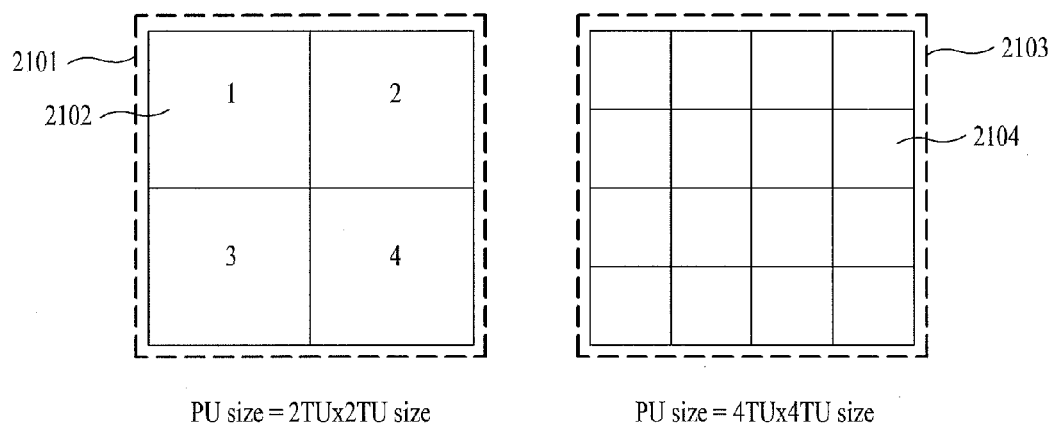
FIG. 21 illustrates a relationship between prediction units and transform units.

According to another aspect of the present invention, a new method for rearranging the order for predicting transform units (TUs) within a given prediction unit is offered. In addition, this current aspect of the present invention introduces a new method for decoding a prediction unit that calls for the immediate reconstruction of a TU after it has been predicted so that the samples within the reconstructed TU can be referenced for performing intra prediction of samples within other TUs in the same prediction unit. Because this current aspect of the present invention is only applicable when there is a plurality of TUs within a single prediction unit, the current aspect of the present invention is only concerned with the case where the TU size is less than the prediction unit size. Two such examples, which are not to be taken as being exhaustive, are illustrated in FIG. 21. On the left, the larger prediction unit 2101 is seen to contain within it four smaller TUs 2102. The dimensional size of the prediction unit on the left could be said to be 2 TUs by 2 TUs. And on the right, the larger prediction unit 2103 is seen to contain within it sixteen smaller TUs 2104. The dimensional size of the prediction unit on the right could be said to be 4 TUs by 4 TUs.

Assuming that a prediction unit is to be intra predicted, a unique characteristic of the prediction unit is that the entire prediction unit will be predicted according to a same intra prediction mode. So when there is a plurality of smaller TUs within a current prediction unit, all of the TUs within the current prediction unit will be predicted according to the same intra prediction mode. In previous decoding methods, each TU within a prediction unit would be predicted according to a raster scan sequence order. An example of this previous raster scan order for predicting TUs can be seen in FIG. 21, where each TU number in the left prediction unit corresponds to an order in which the TUs would be predicted according to the raster scan sequence order. So according to the raster scan sequence, the top left TU is predicted first, followed by the top right TU, then the bottom left and finally the bottom right TU is predicted. The risk of following the same raster scan order for predicting TUs is that it may not be the most efficient predicting order for all prediction units. Therefore the current aspect of the present invention offers to deviate from the previous practice by allowing TUs within a same prediction unit to be predicted in an order that is related to the specific intra prediction mode applied to the current prediction unit. The current aspect of the present invention also offers a more efficient and accurate method for predicting TUs within a same prediction unit by immediately reconstructing samples within a TU that is predicted earlier so that such reconstructed samples are available for reference when predicting later TUs within the same prediction unit. FIGS. 22 through 27 provide examples of this current aspect of the present invention.

For FIGS. 22-27, it is understood that the dotted blocks represent a current prediction unit that is being prediction processed, and the four blocks within the current prediction unit represent four TUs. It is also understood that the gray blocks neighboring the current prediction block are a representation of previously reconstructed samples that will be referenced for predicting samples within the current prediction block according to an intra prediction mode.

Figure 22:
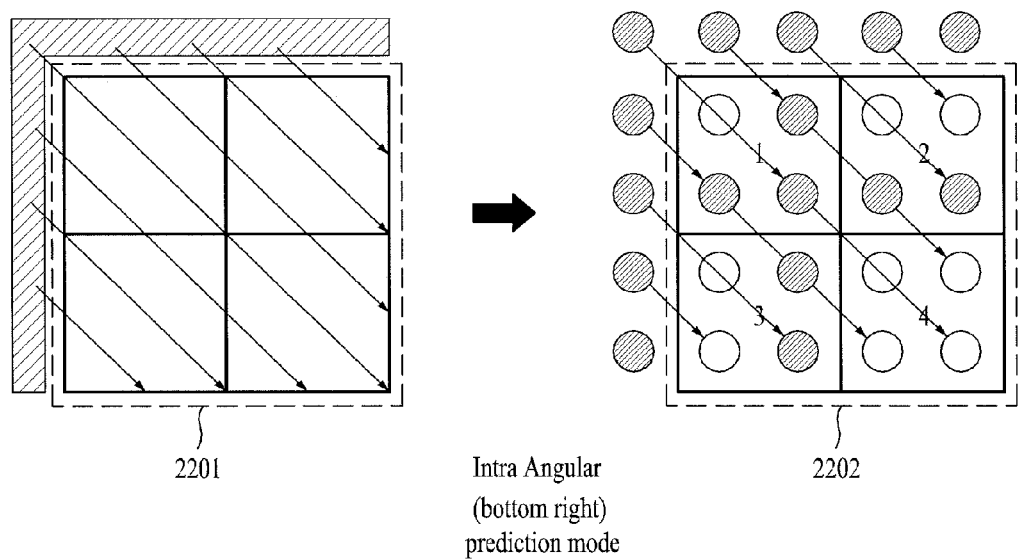
FIG. 22 illustrates one example of re-ordering an order of processing predictions of transform units within a common prediction unit according to the present invention.

FIG. 22 exemplifies the improvements of the current aspect of the present invention in handling intra angular (bottom right) prediction mode processing over the previous decoding method. The depiction on the left generally shows how an intra angular (bottom right) prediction will be processed on the current prediction unit 2201 according to a previous decoding method. A first observation taken from the depiction on the left side is that previously reconstructed reference samples are needed from the left neighboring block and top neighboring block of the current prediction unit 2201 in order to process the intra angular (bottom right) prediction mode on the current prediction unit 2201. A second observation is that the bottom right TU is furthest away from the reference samples that are represented by the gray blocks. Taking these two observations into account, the depiction on the right illustrates how an intra angular (bottom right) prediction will be processed on the current prediction unit 2202 according to the current aspect of the present invention.

The depiction on the right also has the neighboring reference samples that have been previously reconstructed, as seen by the filled in gray dots. According to the current aspect, TU 1 will be predicted first using only the reference samples from the neighboring blocks. After predicting the samples of TU 1, the next TU to be predicted is TU 2. For TU 2, reference samples from the top neighboring block are used to predict the top-left, top-right and bottom-right samples of TU 2. However the bottom-left sample in TU 2 is seen to be predicted by referencing the reference sample located at the top-right of TU 1. This is possible because TU 1 has already been predicted and reconstructed and therefore samples of TU 1 are now available to be referenced when predicting the remaining TUs. After the samples within TU 2 are predicted and reconstructed, TU 3 will begin to be predicted. For TU 3, reference samples from the left neighboring block are used to predict the bottom-right, bottom-left and top-left samples in TU 3. However the top-right sample in TU 3 is seen to be predicted by referencing the reference sample located at the bottom-left of TU 1 that was previously predicted and reconstructed. After the samples within TU 3 are predicted and reconstructed, TU 4 will begin to be predicted. TU 4 is unique because none of the reference samples used to predict TU 4 are referenced from the blocks that neighbor the current prediction unit 2202. All of the reference samples used to predict the samples within TU 4 are referenced from previously predicted and reconstructed TUs within the same prediction unit 2202. So the top-right sample in TU 4 is predicted from the bottom-left reference sample in TU 2, the top-left sample and bottom-right sample in TU 4 are predicted from the bottom-right reference sample in TU 1, and the bottom-left sample in TU 4 is predicted from the top-right reference sample in TU 3.

Although the order of prediction for the TUs in the current prediction unit 2202 may not have changed from what it would have been under the raster scan order, by immediately reconstructing each TU after its prediction processing there is still the realized benefit of more efficient and accurate predictions. This is because previously (as depicted on the left of FIG. 22) all of the samples within the current prediction unit 2201 were predicted based on reference samples from neighboring blocks to the left and top of the current prediction unit. While this may have provided a sufficient prediction for the TU at the top-left location that is proximately closest to the neighboring blocks, by the time prediction processing for the bottom-right TU was applied using the reference samples from the neighboring blocks, the increased distance to the neighboring blocks resulted in more inaccurate predictions. In contrast, the current aspect of the present invention calls for the immediate reconstruction of TUs that have been predicted within the same prediction unit. Thus these reconstructed samples may be referenced when predicting the remaining TUs within the same prediction unit. This offers reference samples that are much closer, and thus more similar, when predicting samples within a given TU. This benefit is best exemplified when predicting the bottom-right TU 4 illustrated in FIG. 22. The distance of the reference sample taken from the adjacent TUs that have been previously reconstructed can be seen to be significantly closer than the distance to the reference samples from the neighboring blocks.

Figure 23:
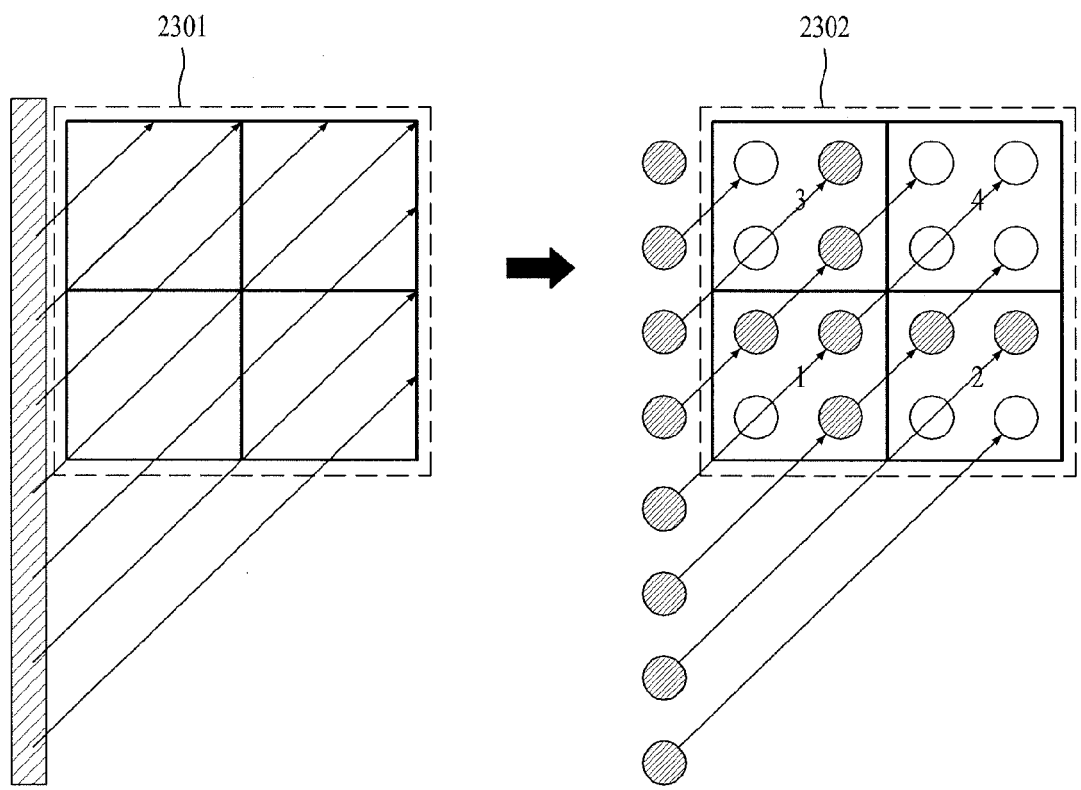
FIG. 23 illustrates another example of re-ordering an order of processing predictions of transform units within a common prediction unit according to the present invention.

FIG. 23 exemplifies the improvements of the current aspect of the present invention in handling intra angular (top right) prediction mode processing over the previous decoding method. According to the previous decoding method depicted on the left, reference samples for predicting the prediction unit 2301 are only available from the neighboring blocks to the left and bottom left of the prediction unit 2301. A first observation is that only reference samples taken from the left neighboring block and bottom-left neighboring block of the current prediction unit 2301 can be used to predict all of the samples within the current prediction unit 2301. A second observation is that the top-right TU within the current prediction unit 2301 is the furthest distance away from the reference sample of the neighboring blocks that will be used to predict it. Taking these two observations into account, the depiction on the right illustrates how an intra angular (top right) prediction will be processed on the current prediction unit 2302 according to the current aspect of the present invention.

According to the current aspect, TU 1 will be predicted first using only the reference samples from the neighboring blocks to the left and bottom-left. After predicting and reconstructing the samples of TU 1, the next TU to be predicted is TU 2. For TU 2, reference samples from the bottom-left neighboring block are used to predict the bottom-left, bottom-right and top-right samples in TU 2. However the top-left sample in TU 2 is seen to be predicted by referencing the reference sample located at the bottom-right in TU 1. After predicting and reconstructing the samples of TU 2, the next TU to be predicted is TU 3 located at the top-left corner of the current prediction unit 2302. For TU 3, reference samples from the neighboring block to the left of the current prediction unit 2302 are used to predict the top-left, top-right and bottom-left samples of TU 3. However FIG. 23 illustrates that the bottom-right sample in TU 3 is predicted by referencing the previously reconstructed top-left reference sample in TU 1. After predicting and reconstructing the samples of TU 3, TU 4 is the next to be predicted. TU 4 is unique in that no reference samples are taken from the blocks that neighbor the current prediction unit 2302 when predicting TU 4. All of the reference samples used to predict TU 4 are taken from adjacent TUs within the same current prediction unit 2302 as TU 4. For TU 4, the top-left sample in TU 4 is predicted by referencing the previously reconstructed bottom-right reference sample in TU 3, the bottom-left sample and top-right sample in TU 4 is predicted by referencing the previously reconstructed top-right reference sample from TU 1, and the bottom-right sample in TU 4 is predicted by referencing the previously reconstructed top-left reference sample in TU 2.

Figure 24:
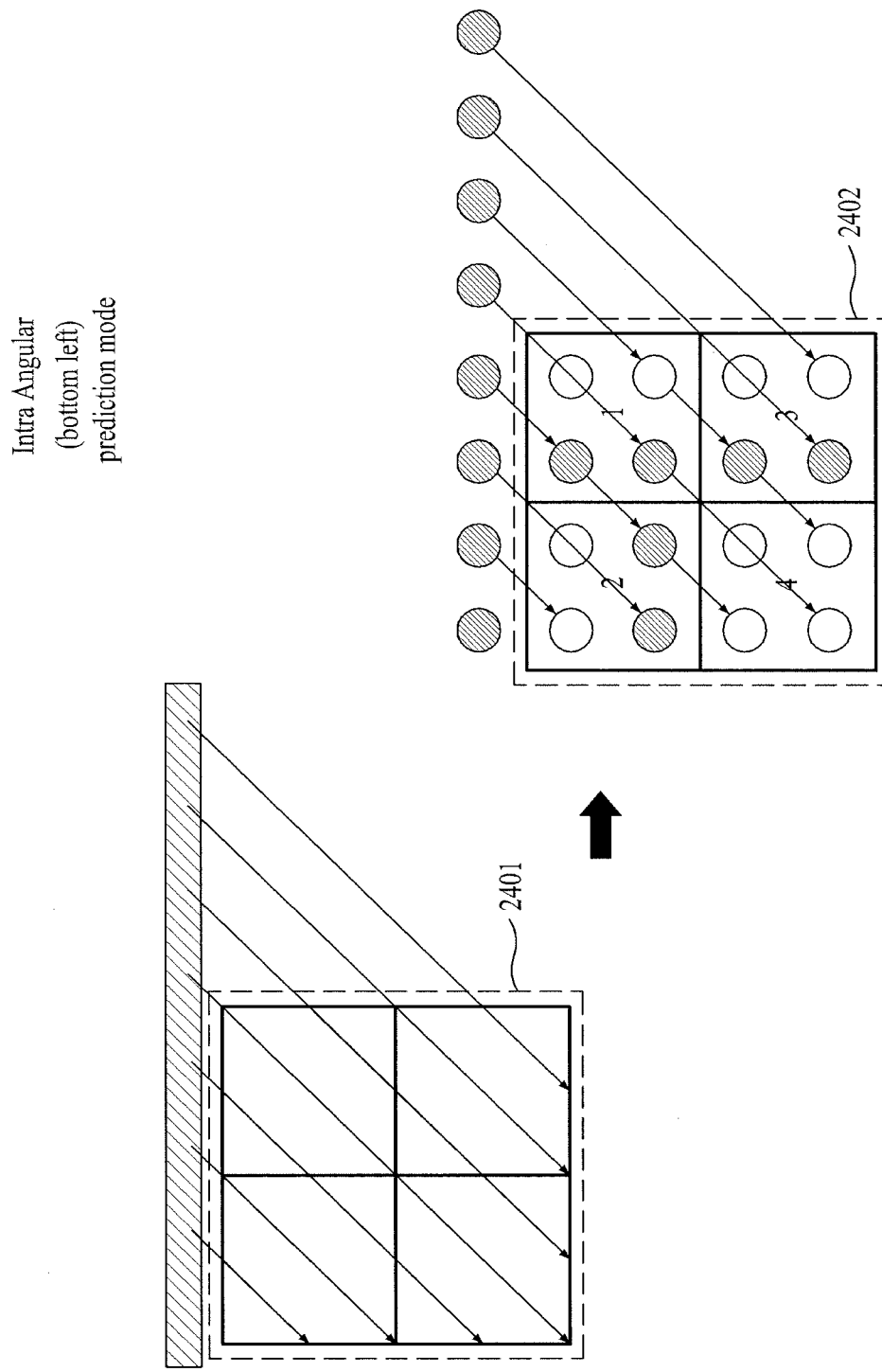
FIG. 24 illustrates another example of re-ordering an order of processing predictions of transform units within a common prediction unit according to the present invention.

FIG. 24 exemplifies the improvements of the current aspect of the present invention in handling intra angular (bottom left) prediction mode processing over the previous decoding method. According to the previous decoding method depicted on the left, reference samples for predicting the prediction unit 2401 are only available from the neighboring blocks to the top and top-right of the current prediction unit 2401. A first observation is that only reference samples taken from the top neighboring block and top-right neighboring block of the current prediction unit 2401 can be used to predict all of the samples within the current prediction unit 2401. A second observation is that the bottom-left TU within the current prediction unit 2401 is the furthest distance away from the reference sample of the neighboring block that will be used to predict it. Taking these two observations into account, the depiction on the right illustrates how an intra angular (bottom left) prediction will be processed on the current prediction unit 2402 according to the current aspect of the present invention.

According to the current aspect, TU 1 will be predicted first by referencing only the reference samples from the neighboring blocks to the top and top-right. After predicting the samples of TU 1, the next TU to be predicted is TU 2. For TU 2, reference samples from the top neighboring block are referenced to predict the bottom-left, top-right and top-left samples in TU 2. However the bottom-right sample in TU 2 is seen to be predicted by referencing the previously reconstructed top-left reference sample in TU 1. After predicting and reconstructing the samples of TU 2, the next TU to be predicted is TU 3 located at the bottom-right corner of the current prediction unit 2402. For TU 3, reference samples from the neighboring block to the top-right of the current prediction unit 2402 are referenced to predict the top-right, bottom-left and bottom-right samples in TU 3. However FIG. 24 illustrates that the top-left sample in TU 3 is predicted by referencing the previously reconstructed bottom-right reference sample in TU 1. After predicting and reconstructing the samples of TU 3, TU 4 is the next to be predicted. TU 4 is unique in that no reference samples are taken from the blocks that neighbor the current prediction unit 2302 when predicting TU 4. All of the reference samples used to predict TU 4 are referenced from adjacent TUs within the same current prediction unit 2302 as TU 4. For TU 4, the top-left sample in TU 4 is predicted from the previously reconstructed bottom-right reference sample in TU 2, the bottom-left sample and top-right sample in TU 4 is predicted from the previously reconstructed bottom-left reference sample from TU 1, and the bottom-right sample in TU 4 is predicted from the previously reconstructed top-left reference sample in TU 3.

Figure 25:
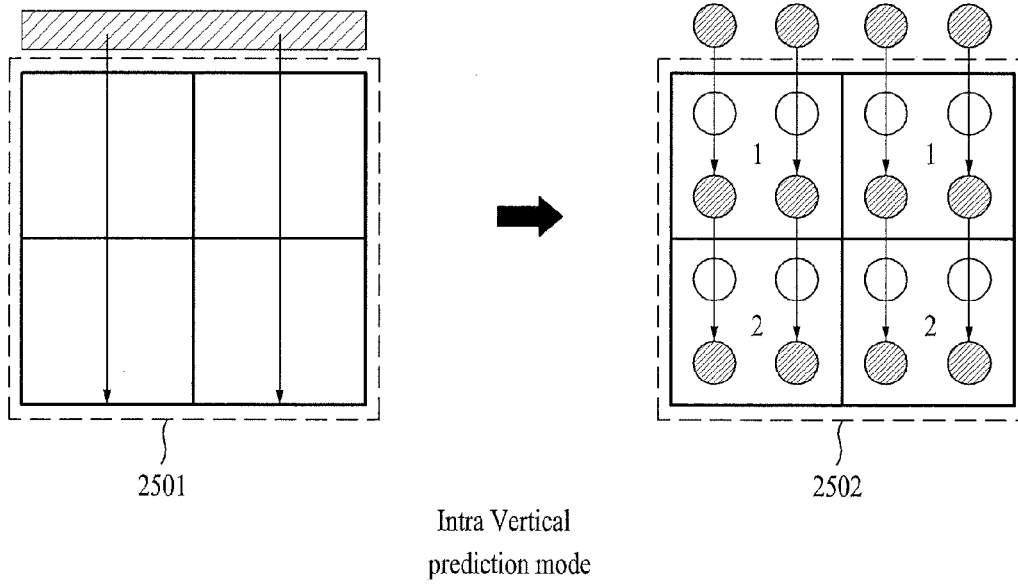
FIG. 25 illustrates another example of re-ordering an order of processing predictions of transform units within a common prediction unit according to the present invention.

FIG. 25 exemplifies the improvements of the current aspect of the present invention in handling intra vertical prediction mode processing over the previous decoding method. According to the previous decoding method depicted on the left, reference samples for predicting the prediction unit 2501 are only available from the neighboring block to the top of the current prediction unit 2501. A first observation is that only reference samples taken from the top neighboring block of the current prediction unit 2501 can be referenced to predict all of the samples within the current prediction unit 2501. A second observation is that the bottom-most TUs within the current prediction unit 2501 are the furthest distance away from the reference samples of the neighboring block that will be used to predict it. Taking these two observations into account, the depiction on the right illustrates how an intra vertical prediction will be processed on the current prediction unit 2502 according to the current aspect of the present invention.

According to the current aspect, both the top-left and top-right TUs of the current prediction unit 2502 are labeled as TU 1 and will be predicted first using only the reference samples from the neighboring block to the top as seen in FIG. 25. Both TUs units marked as TU 1 are able to be predicted at a same time under parallel processing principles made available in a decoding unit processing the intra vertical prediction on the current prediction unit 2502. After predicting the samples of the two TU 1 transform units, the next TUs to be predicted are the bottom-left and bottom-right transform units both marked as TU 2. For each transform unit marked as TU 2, reference samples from the transform units TU 1 located above each TU 2 will be referenced to predict the samples in each TU 2. With respect to the TU 2 located at the bottom-left of the current prediction unit 2502, the previously reconstructed reference samples from the bottom row of the TU 1 located at the top-left of current prediction unit 2502 will be referenced to predict the samples of TU 2 located at the bottom-left. With reference to the TU 2 located at the bottom-right of the current prediction unit 2502, the previously reconstructed reference samples from the bottom row of the TU 1 located at the top-right of the current prediction unit 2205 will be referenced to predict the samples of TU 2 located at the bottom-right.

Figure 26:
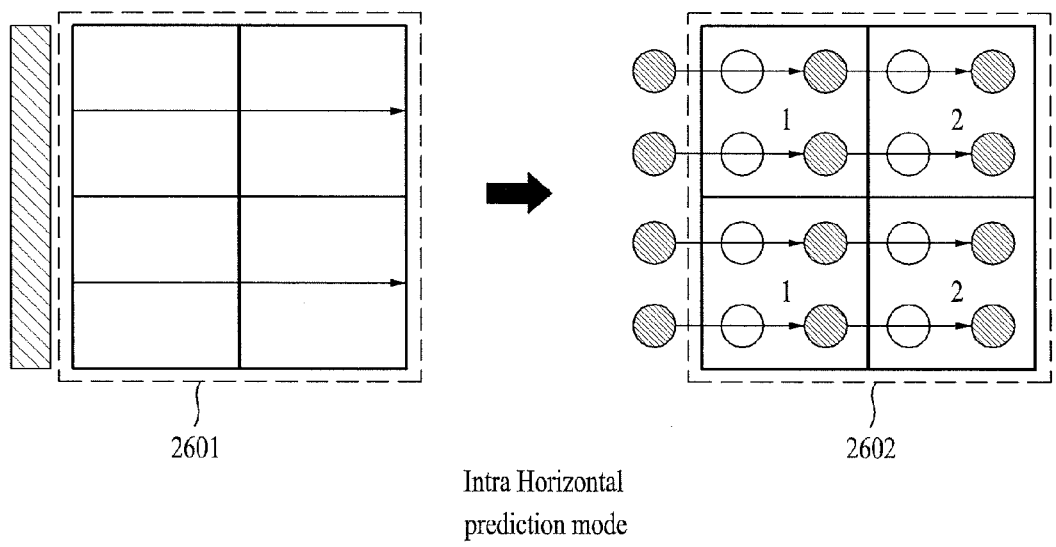
FIG. 26 illustrates another example of re-ordering an order of processing predictions of transform units within a common prediction unit according to the present invention.

FIG. 26 exemplifies the improvements of the current aspect of the present invention in handling intra horizontal prediction mode processing over the previous decoding method. According to the previous decoding method depicted on the left, reference samples for predicting the prediction unit 2601 are only available from the neighboring block to the left of the current prediction unit 2601. A first observation is that only reference samples taken from the left neighboring block of the current prediction unit 2601 can be used to predict all of the samples within the current prediction unit 2601. A second observation is that the right-most TUs within the current prediction unit 2601 are the furthest distance away from the reference samples of the neighboring block that will be used to predict it. Taking these two observations into account, the depiction on the right illustrates how an intra horizontal prediction will be processed on the current prediction unit 2602 according to the current aspect of the present invention.

According to the current aspect, both the top-left and bottom-left TUs of the current prediction unit 2602 are labeled as TU 1 and will be predicted first using only the reference samples from the neighboring block to the left as seen in FIG.

25. Both TUs units marked as TU 1 are able to be predicted at a same time under parallel processing principles made available in a decoding unit processing the intra vertical prediction on the current prediction unit 2602. After predicting the samples of the two TU 1 transform units, the next transform units to be predicted are the bottom-right and top-right transform units both marked as TU 2. For each transform unit marked as TU 2, reference samples from the transform units TU 1 located to the left of each TU 2 will be referenced to predict the samples in each TU 2. With respect to the TU 2 located at the top-right of the current prediction unit 2502, the previously reconstructed reference samples from the right-most column of the TU 1 located at the top-left of current prediction unit 2502 will be referenced to predict the samples of TU 2 located at the top-right. With reference to the TU 2 located at the bottom-right of the current prediction unit 2502, the previously reconstructed reference samples from the right-most column of the TU 1 located at the bottom-left of the current prediction unit 2205 will be referenced to predict the samples of TU 2 located at the bottom-right.

Figure 27:
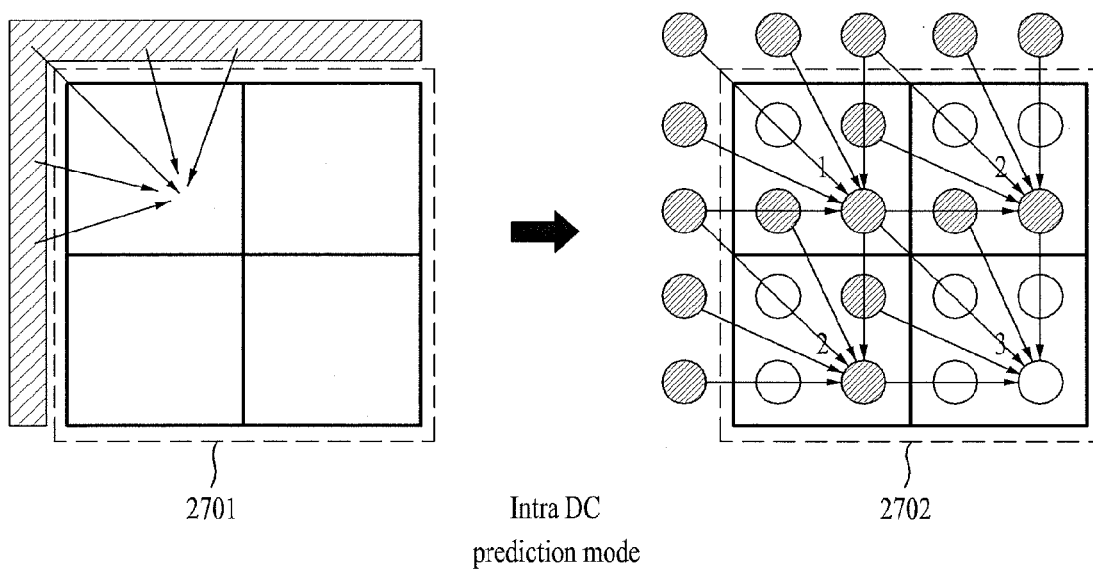
FIG. 27 illustrates another example of re-ordering an order of processing predictions of transform units within a common prediction unit according to the present invention.

FIG. 27 exemplifies the improvements of the current aspect of the present invention in handling intra DC prediction mode processing over the previous decoding method. According to the previous decoding method depicted on the left, reference samples for predicting the prediction unit 2701 are only available from the neighboring blocks to the left and top of the current prediction unit 2701. A first observation is that only reference samples taken from the left neighboring block and top neighboring block of the current prediction unit 2701 can be used to predict all of the samples within the current prediction unit 2701. A second observation is that the bottom-right TU within the current prediction unit 2701 is the furthest distance away from the reference samples of the neighboring blocks that will be used to predict it. Taking these two observations into account, the depiction on the right illustrates how an intra DC prediction will be processed on the current prediction unit 2702 according to the current aspect of the present invention.

The exemplary illustration of the intra DC prediction mode according to the current aspect of the present invention is made in FIG. 27 for only a bottom-right sample for each of the TUs within the current prediction unit 2702. However it is within the scope of the present invention for the same intra DC prediction mode be processed for each of the samples within each of the TUs of current prediction unit 2702.

Referring to the depiction on the right side of FIG. 27, TU 1 is the first of the four transform units to be predicted. The bottom-right sample of TU 1 is predicted by taking the mean of the values of reference samples taken from the neighboring top block and neighboring left block. The reference sample located at the forty five degree angle to the top-left may be part of the neighboring top block, neighboring left block, or a separate neighboring top-left block that has previously been reconstructed. After TU 1 is predicted and then reconstructed, all of the reference samples needed to predict both the transform units marked as TU 2 have been reconstructed either from TU 1 or the neighboring top block and neighboring left block. Thus both transform units marked as TU 2 may be predicted simultaneously according to the principles of parallel processing available in a decoding unit processing the intra DC prediction of the current prediction unit 2702. Or if parallel processing is not available in the decoding unit, either one of the transform units marked as TU 2 may be predicted first. After both of the transform units marked as TU 2 have been predicted and reconstructed, then TU 3 will be predicted. TU 3 is unique because none of the reference samples needed to process the intra DC prediction on TU 3 are needed to be obtained from the neighboring top block and neighboring left block. All of the reference samples needed to predict TU 3 are available from the previously reconstructed reference samples from TU 1 and the two TU 2 transform units.

By rearranging the order of predicting transform units within a common current prediction unit and immediately reconstructing the transform units as they are predicted, the current aspect of the present invention makes reconstructed samples within a TU available to be used as reference samples when predicting remaining TUs that have not yet been prediction processed. By making reference samples available from a fellow transform unit within a common current prediction unit, the present invention also offers a new method of decoding that results in more accurate predictions of remaining samples in transform units that have not yet been predicted. The result of more accurate predictions is achieved by decreasing the distance between a reference sample in relation to the current prediction sample. Whereas the previous decoding method only made reconstructed samples from neighboring blocks available as reference samples, the present invention makes reconstructed samples from fellow transform units within a common current prediction unit available as reference samples when prediction processing another fellow transform unit.

Figure 28:
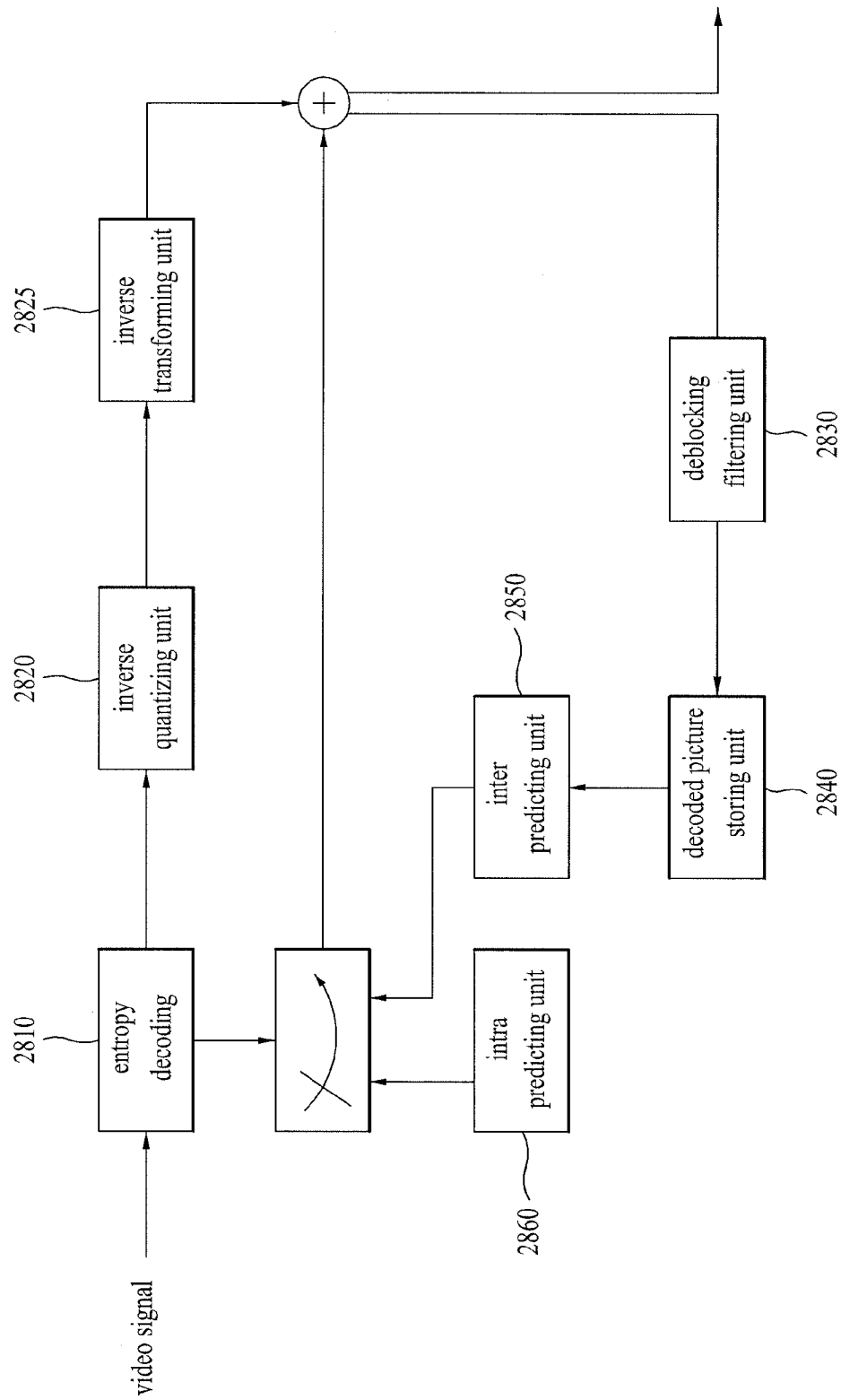
FIG. 28 illustrates a decoding unit according to the present invention.

FIG. 28 is a schematic block diagram of a video signal decoding unit that may be used to perform the new intra angular mode predictions according to the present invention.

Referring to FIG. 28, the decoding unit according to the present invention includes an entropy decoding unit 2810, an inverse quantizing unit 2820, an inverse transforming unit 2825, a deblocking filtering unit 2830, a decoded/reconstructed picture storing unit 2840, an inter prediction unit 2850 and an intra prediction unit 2860.

The entropy decoding unit 2810 extracts a transform coefficient of each block of video data, a motion vector, a reference picture index and the like by performing entropy decoding on a video signal bitstream that is encoded by an encoding unit (not pictured). The inverse quantizing unit 2820 inverse-quantizes the entropy decoded transform coefficient, and the inverse transforming unit 2825 then restores an original sample value using the inverse-quantized transform coefficient. The deblocking filtering unit 2830 is applied to each coded block of video data to reduce block distortion. A picture through filtering is stored in the decoded picture storing unit 2840 to be outputted or used as a reference picture. The inter predicting unit 2850 predicts a current picture using the reference picture stored in the decoded picture storing unit 2840 and inter prediction information (e.g., reference picture index, motion vector, etc.) delivered from the entropy decoding unit 2810. In particular, motion vectors of blocks adjacent to a current block (ie. neighboring blocks) are extracted from a video signal. A predicted motion vector of the current block may be obtained from the neighboring block. The neighboring block may include a block located at a left, top or right top side of the current block. For instance, a predicted motion vector of a current block may be obtained using median value of horizontal and vertical components of motion vectors of neighboring blocks. Alternatively, in case that a left block of a current block has at least one prediction block coded in an inter mode, a predicted motion vector of the current block may be obtained using a motion vector of a prediction block located at a top side of the current block. In case that a top block of a current block has at least one prediction block coded in an inter mode, a predicted motion vector of the current block may be obtained using a motion vector of a prediction block located at a most left side. In case that blocks located at top and right sides of a current block among neighboring blocks are located outside a boundary of a picture or slice, a predicted motion vector of the current block may be set to a motion vector of a left block. If there exists one block having the same reference picture index of a current block among neighboring blocks, a motion vector of the block may be used for motion prediction.

The intra predicting unit 2860 performs intra prediction by referencing previously reconstructed samples from within a current picture. The reconstructed sample within the current picture may include a sample to which deblocking filtering is not applied. An original picture is then reconstructed by adding the predicted current picture and a residual outputted from the inverse transforming unit 2825 together. For each prediction unit of video data, each current prediction sample of a current prediction unit will be processed according to the new intra planar mode prediction of the present invention by the intra prediction unit 2860. Then the predicted current prediction samples will be reconstructed by combining the predicted samples with a residual outputted from the inverse transforming unit 2825.

Figure 29:
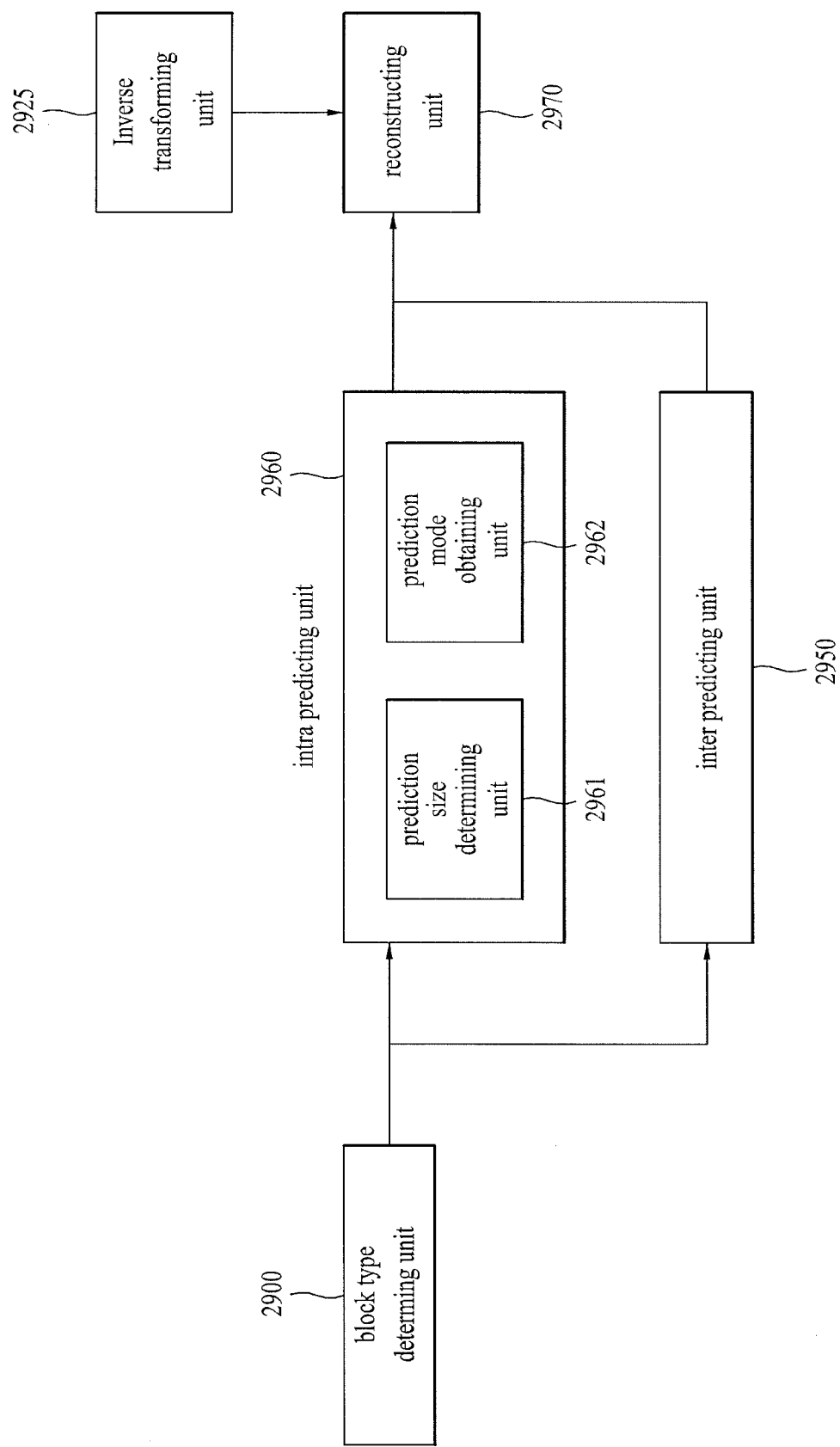
FIG. 29 illustrates a close up for prediction units that are part of a decoding unit according to the present invention.

FIG. 29 is a block diagram of an alternative view of the decoding unit illustrated by FIG. 28. Fig. additionally includes a block type determining unit 2900 and a reconstructing unit 2970. The block type determining unit 2900 determines whether a current prediction unit is an inter predicted type unit or an intra prediction type unit. If the block type determining unit determines that the current prediction unit is an inter prediction type unit then the current prediction unit will be sent along to the inter prediction unit 2950. And if the block type determining unit determines that the current prediction unit is an intra prediction type unit, then the current prediction unit will be sent along to the intra prediction unit 2960.

FIG. 29 also illustrates that the intra prediction unit 2960 is comprised of a prediction size determining unit 2961 and a prediction mode obtaining unit 2962. The prediction size determining unit 2961 is able to determine the size of a current prediction unit that is being predicted by the intra prediction unit 2960 by either parsing identifying information that is encoded into the video signal by an encoding unit and is received by the decoding unit, or by directly processing the current prediction unit to determine its size. So according to the first method, the encoding unit that encodes the video signal and accompanying identifying information, will include size information for each prediction unit of video data that is encoded into the video signal. Then the decoding unit need only parse the identifying information from the video signal to determine the size for each prediction unit it receives. According to the second method, the encoding unit does not expressly include size information for each prediction unit of video data into the video signal. Instead, the prediction size determining unit 2961 of the decoding unit is tasked with processing each prediction unit to determine the size of each prediction unit. It should be noted that according to the first method, the actual parsing of the identifying information to determine the size of each prediction unit may be processed by either the prediction size determining unit 2961 or the entropy decoding unit 2810 as seen in FIG. 28.

The prediction mode obtaining unit 2962 is tasked with parsing identifying information that is included in a video signal to determine the proper intra prediction mode to apply to each current prediction unit that is being predicted by the intra prediction unit 2960. So according to the present invention, the prediction mode obtaining unit 2962 will process signaling information from the identifying information included in a video signal and determine from the signaling information that the new intra planar mode for prediction should be applied to a current prediction unit.

And once the current prediction unit is properly predicted by the intra prediction unit 2960 according to the proper intra prediction mode identified by the prediction mode determining unit 2962, the predicted samples of the current prediction unit will be reconstructed by the reconstructing unit 2970. The reconstructing unit 2970 is able to reconstruct the predicted samples by combining them with residual values obtained from the inverse transforming unit 2925.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for processing a video signal using intra prediction, the method comprising:
   receiving the video signal, the video signal including a current prediction unit and intra prediction mode information corresponding to the current prediction unit;
   obtaining the intra prediction mode information from the video signal;
   when an angular line represented by the intra prediction mode information passes through a point between reference samples of a first neighboring block of the current prediction unit and a reference sample of a second neighboring block of the current prediction unit, the first neighboring block being different from the second neighboring block:
   estimating a virtual reference sample corresponding to the point using a first linear interpolation between the reference samples of the first neighboring block; and
   predicting a current sample of the current prediction unit using a second linear interpolation between the estimated virtual reference sample of the first neighboring block and the reference sample of the second neighboring block,
   wherein the virtual reference sample of the first neighboring block and the reference sample of the second neighboring block are located on the angular line represented by the intra prediction mode information, and
   wherein the first neighboring block including the virtual reference sample corresponds to a top neighboring block of the current prediction unit and the second neighboring block corresponds to a left neighboring block of the current prediction unit, or the first neighboring block including the virtual reference sample corresponds to a left neighboring block of the current prediction unit and the second neighboring block corresponds to a top neighboring block of the current prediction unit.

2. The method of claim 1, wherein the reference samples include a first reference sample and a second reference sample and the reference samples of the first neighboring block are integer pixels neighboring each other.

3. The method of claim 1, wherein predicting the current sample of the current prediction unit using the second linear interpolation of the virtual reference sample of the first neighboring block and the reference sample of the second neighboring block includes performing the second linear interpolation by applying a first weight to the reference sample of the second neighboring block and applying a second weight to the virtual reference sample of the first neighboring block, wherein the first weight is determined to be in inverse proportion to a first distance from the current sample to the reference sample of the second neighboring block and the second weight is determined to be in inverse proportion to a second distance from the current sample to the virtual reference sample of the first neighboring block.

4. The method of claim 1, further comprising:

when the angular line represented by the intra prediction mode information passes through a first point between reference samples of a first neighboring block of the current prediction unit and a second point between reference samples of a second neighboring block of the current prediction unit:

estimating a first virtual reference sample corresponding to the first point using a third linear interpolation of the reference samples of the first neighboring block, and estimating a second virtual reference sample corresponding to the second point using a fourth linear interpolation of the reference samples of the second neighboring block; and predicting a current sample of the current prediction unit using a fifth linear interpolation of the first virtual reference sample of the first neighboring block and the second virtual reference sample of the second neighboring block, wherein the first virtual reference sample and the second virtual reference sample are located on the angular line represented by the intra prediction mode information.

5. The method of claim 1, further comprising:

when the angular line represented by the intra prediction mode information passes through a reference sample of the first neighboring block of the current prediction unit and the reference sample of the second neighboring block of the current prediction unit, predicting the current sample of the current prediction unit using a sixth linear interpolation of the reference sample of the first neighboring block and the reference sample of the second neighboring block.

* * * * *